(12) United States Patent
Landa et al.

(10) Patent No.: US 10,906,064 B2
(45) Date of Patent: Feb. 2, 2021

(54) PRINTING SYSTEM AND METHOD

(71) Applicant: ACTEGA Metal Print GmbH, Lehrte (DE)

(72) Inventors: Benzion Landa, Nes Ziona (IL); Anton Krassilnikov, Durham, NH (US); Moshe Fahima, Tel Aviv (IL); Vadim Yakhel, Kiryat Gat (IL); Barak Edgar, Kibbutz Netzer Sereni (IL)

(73) Assignee: ACTEGA METAL PRINT GMBH, Wesel (DE)

( * ) Notice: Subject to any disclaimer, the term of this patent is extended or adjusted under 35 U.S.C. 154(b) by 31 days.

(21) Appl. No.: 15/577,171

(22) PCT Filed: May 27, 2016

(86) PCT No.: PCT/IB2016/053145
§ 371 (c)(1),
(2) Date: Nov. 27, 2017

(87) PCT Pub. No.: WO2016/189515
PCT Pub. Date: Dec. 1, 2016

(65) Prior Publication Data
US 2018/0200751 A1 Jul. 19, 2018

(30) Foreign Application Priority Data

May 27, 2015 (GB) .................................. 1509080.6
Aug. 17, 2015 (GB) .................................. 1514618.6
(Continued)

(51) Int. Cl.
*B05C 19/06* (2006.01)
*B41J 2/005* (2006.01)
(Continued)

(52) U.S. Cl.
CPC ............ *B05C 19/06* (2013.01); *B05B 7/1481* (2013.01); *B05B 9/00* (2013.01); *B05B 9/01* (2013.01);
(Continued)

(58) Field of Classification Search
CPC .................................. B05D 1/283; B05D 1/28
See application file for complete search history.

(56) References Cited

U.S. PATENT DOCUMENTS

| 1,905,959 A | 4/1933 | Walter |
| 3,127,668 A | 4/1964 | Troy |

(Continued)

FOREIGN PATENT DOCUMENTS

| CA | 2520442 | 3/2007 |
| CN | 101337469 | 1/2009 |

(Continued)

OTHER PUBLICATIONS

International Search Report, International Patent Application No. PCT/IB2016/053145, dated Oct. 11, 2016, 4 pages.

(Continued)

*Primary Examiner* — Alex A Rolland
(74) *Attorney, Agent, or Firm* — Fitch, Even, Tabin & Flannery L.L.P.

(57) ABSTRACT

There is disclosed a method of printing onto the surface of a substrate, which method comprises i) coating a donor surface with a monolayer of particles, ii) treating the substrate surface to render at least selected regions tacky, and iii) contacting the substrate surface with the donor surface to cause particles to transfer from the donor surface only to the tacky regions of the substrate surface. After printing on a substrate, the donor surface returns to the coating station where the continuity of the monolayer is restored by recov- (Continued)

ering with fresh particles the regions of the donor surface exposed by the transfer of particles to the substrate.

26 Claims, 9 Drawing Sheets

(30) Foreign Application Priority Data

Aug. 17, 2015 (GB) .................................. 1514619.4
Mar. 8, 2016 (GB) .................................. 1603997.6

(51) Int. Cl.
| | |
|---|---|
| B41C 1/18 | (2006.01) |
| B41F 19/00 | (2006.01) |
| B41M 3/00 | (2006.01) |
| B41M 5/00 | (2006.01) |
| B41M 1/00 | (2006.01) |
| B05D 1/00 | (2006.01) |
| B41F 31/18 | (2006.01) |
| B05B 9/00 | (2006.01) |
| B05C 1/00 | (2006.01) |
| B05C 11/02 | (2006.01) |
| B05D 1/12 | (2006.01) |
| B05D 1/28 | (2006.01) |
| B05D 3/00 | (2006.01) |
| B05B 7/14 | (2006.01) |
| B05C 1/08 | (2006.01) |
| B05D 3/12 | (2006.01) |
| C09D 1/00 | (2006.01) |
| C09D 5/38 | (2006.01) |
| C23C 24/04 | (2006.01) |
| B44F 9/10 | (2006.01) |
| B41M 1/22 | (2006.01) |
| B05B 9/01 | (2006.01) |
| B41M 1/04 | (2006.01) |
| B44C 1/24 | (2006.01) |
| B44C 1/28 | (2006.01) |

(52) U.S. Cl.
CPC .............. *B05C 1/00* (2013.01); *B05C 1/0808* (2013.01); *B05C 1/0817* (2013.01); *B05C 11/023* (2013.01); *B05D 1/00* (2013.01); *B05D 1/12* (2013.01); *B05D 1/28* (2013.01); *B05D 3/007* (2013.01); *B05D 3/12* (2013.01); *B41C 1/184* (2013.01); *B41F 19/001* (2013.01); *B41F 19/002* (2013.01); *B41F 19/005* (2013.01); *B41F 31/18* (2013.01); *B41J 2/0057* (2013.01); *B41M 1/00* (2013.01); *B41M 1/04* (2013.01); *B41M 1/22* (2013.01); *B41M 3/00* (2013.01); *B41M 3/001* (2013.01); *B41M 5/00* (2013.01); *B41M 5/0017* (2013.01); *B44C 1/24* (2013.01); *B44C 1/28* (2013.01); *B44F 9/10* (2013.01); *C09D 1/00* (2013.01); *C09D 5/38* (2013.01); *C23C 24/04* (2013.01)

(56) References Cited

U.S. PATENT DOCUMENTS

| | | |
|---|---|---|
| 3,264,132 A | 8/1966 | Merrill |
| 4,141,313 A | 2/1979 | Hefele |
| 4,465,538 A | 8/1984 | Schmoock |
| 4,687,531 A | 8/1987 | Potoczky |
| 4,741,918 A | 5/1988 | Nagy De Nagybaczon |
| 4,985,733 A | 1/1991 | Kurotori |
| 5,083,710 A | 1/1992 | McLoughlin |
| 5,101,759 A | 4/1992 | Hefele |
| 5,280,052 A | 1/1994 | Questel |
| 5,520,973 A | 5/1996 | Kamen |
| 5,735,994 A | 4/1998 | Lappe |
| 5,751,327 A | 5/1998 | De Cock |
| 6,132,547 A | 10/2000 | Marsh |
| 6,214,106 B1 | 4/2001 | Weber |
| 6,469,728 B1 | 10/2002 | Charnitski |
| 6,487,002 B1 | 11/2002 | Biegelsen |
| 6,620,234 B1 | 9/2003 | Kostelnik |
| 6,623,816 B1 | 9/2003 | Tanikawa |
| 6,719,423 B2 | 4/2004 | Chowdry |
| 7,002,613 B2 | 2/2006 | Beier |
| 7,776,196 B2 | 8/2010 | Fujimoto |
| 9,181,085 B2 | 11/2015 | Yoon |
| 10,061,200 B2 | 8/2018 | Rubin |
| 10,336,059 B2 | 7/2019 | Landa |
| 10,583,455 B2 | 3/2020 | Landa |
| 2002/0031645 A1* | 3/2002 | Sano .................. B05D 1/00 428/143 |
| 2002/0159801 A1 | 10/2002 | Nakashima |
| 2003/0067529 A1 | 4/2003 | May |
| 2003/0129302 A1* | 7/2003 | Chambers ............... B05B 5/057 427/180 |
| 2005/0022730 A1 | 2/2005 | Rizzoli |
| 2005/0244584 A1 | 11/2005 | Afshar |
| 2006/0003097 A1 | 1/2006 | Andres |
| 2006/0046005 A1 | 3/2006 | McGee |
| 2006/0109440 A1 | 5/2006 | Willem |
| 2006/0147637 A1 | 7/2006 | Cooprider |
| 2006/0165444 A1 | 7/2006 | Nanjo |
| 2007/0281136 A1 | 12/2007 | Hampden-Smith |
| 2008/0166495 A1 | 7/2008 | Maeno |
| 2008/0181667 A1 | 7/2008 | Nomura |
| 2008/0187691 A1 | 8/2008 | Osgood |
| 2009/0009580 A1 | 1/2009 | Nomura |
| 2009/0140631 A1 | 6/2009 | Jo |
| 2009/0317555 A1 | 12/2009 | Hori |
| 2010/0020835 A1 | 1/2010 | Anan |
| 2010/0080594 A1 | 4/2010 | Sowa |
| 2010/0178308 A1 | 7/2010 | Iwasa |
| 2010/0208351 A1 | 8/2010 | Nofi |
| 2012/0103212 A1 | 5/2012 | Stowe |
| 2012/0212551 A1 | 8/2012 | Furukawa |
| 2012/0285617 A1 | 11/2012 | Azami |
| 2013/0065019 A1 | 3/2013 | Campeau |
| 2013/0209758 A1 | 8/2013 | Campeau |
| 2013/0233189 A1 | 9/2013 | Wittmann |
| 2013/0235116 A1 | 9/2013 | Takemoto |
| 2013/0257992 A1 | 10/2013 | Panchawagh |
| 2013/0295328 A1 | 11/2013 | Baran, Jr. |
| 2014/0063161 A1 | 3/2014 | Liu |
| 2014/0141184 A1 | 5/2014 | Yoon |
| 2014/0168330 A1 | 6/2014 | Liu |
| 2014/0209691 A1 | 7/2014 | Finn |
| 2014/0329729 A1 | 11/2014 | Becker-Willinger |
| 2015/0118389 A1 | 4/2015 | Jang |
| 2017/0008272 A1 | 1/2017 | Landa |
| 2017/0072428 A1 | 3/2017 | Landa |
| 2017/0075226 A1 | 3/2017 | Nagler |
| 2018/0147871 A1 | 5/2018 | Landa |
| 2018/0178244 A1 | 6/2018 | Landa |

FOREIGN PATENT DOCUMENTS

| | | |
|---|---|---|
| DE | 19707157 | 8/1998 |
| EP | 0195857 | 10/1986 |
| EP | 1359792 | 11/2003 |
| EP | 1 280 612 B1 | 4/2004 |
| EP | 2036734 | 3/2009 |
| EP | 2481597 | 8/2012 |
| GB | 712437 | 7/1954 |
| GB | 0830836 | 3/1960 |
| GB | 2034608 | 6/1980 |
| GB | 2259888 | 3/1993 |
| GB | 2353532 | 2/2001 |
| GB | 2368313 | 5/2002 |
| GB | 2536361 | 9/2016 |
| JP | S2013553 | 2/1977 |

(56) References Cited

FOREIGN PATENT DOCUMENTS

| | | |
|---|---|---|
| JP | S60171586 | 9/1985 |
| JP | S60245589 | 12/1985 |
| JP | S6168253 | 4/1986 |
| JP | H02290273 | 11/1990 |
| JP | H1070151 | 3/1998 |
| JP | H10151390 | 6/1998 |
| JP | H11188921 | 7/1999 |
| JP | H11239741 | 9/1999 |
| JP | 2002045777 | 2/2002 |
| JP | 2002182019 | 6/2002 |
| JP | 2002254696 | 9/2002 |
| JP | 2004090330 | 3/2004 |
| JP | 2005004038 | 1/2005 |
| JP | 2005508746 | 4/2005 |
| JP | 2005140945 | 6/2005 |
| JP | 2006263537 | 10/2006 |
| JP | 2007038142 | 2/2007 |
| JP | 2008526476 | 7/2008 |
| JP | 2008194897 | 8/2008 |
| JP | 2012066227 | 4/2012 |
| JP | 2012171184 | 9/2012 |
| JP | 2012179724 | 9/2012 |
| JP | 2014168946 | 9/2014 |
| WO | 1995031337 | 11/1995 |
| WO | 1999065699 | 12/1999 |
| WO | 2010077779 | 7/2010 |
| WO | 2012156728 | 11/2012 |
| WO | 2013132418 | 9/2013 |
| WO | 2013191535 | 12/2013 |
| WO | 2014063161 | 4/2014 |
| WO | 2016189513 | 12/2016 |
| WO | 2016189514 | 12/2016 |
| WO | 2016189515 | 12/2016 |
| WO | 2016189516 | 12/2016 |
| WO | 2016189519 | 12/2016 |

OTHER PUBLICATIONS

Written Opinion, International Patent Application No. PCT/IB2016/053145, dated Oct. 11, 2016, 7 pages.
International Search Report and Written Opinion for International Patent Application No. PCT/IB2016/053154, dated Oct. 11, 2016.
International Search Report and Written Opinion for International Patent Application No. PCT/IB2016/053146, dated Oct. 10, 2016.

* cited by examiner

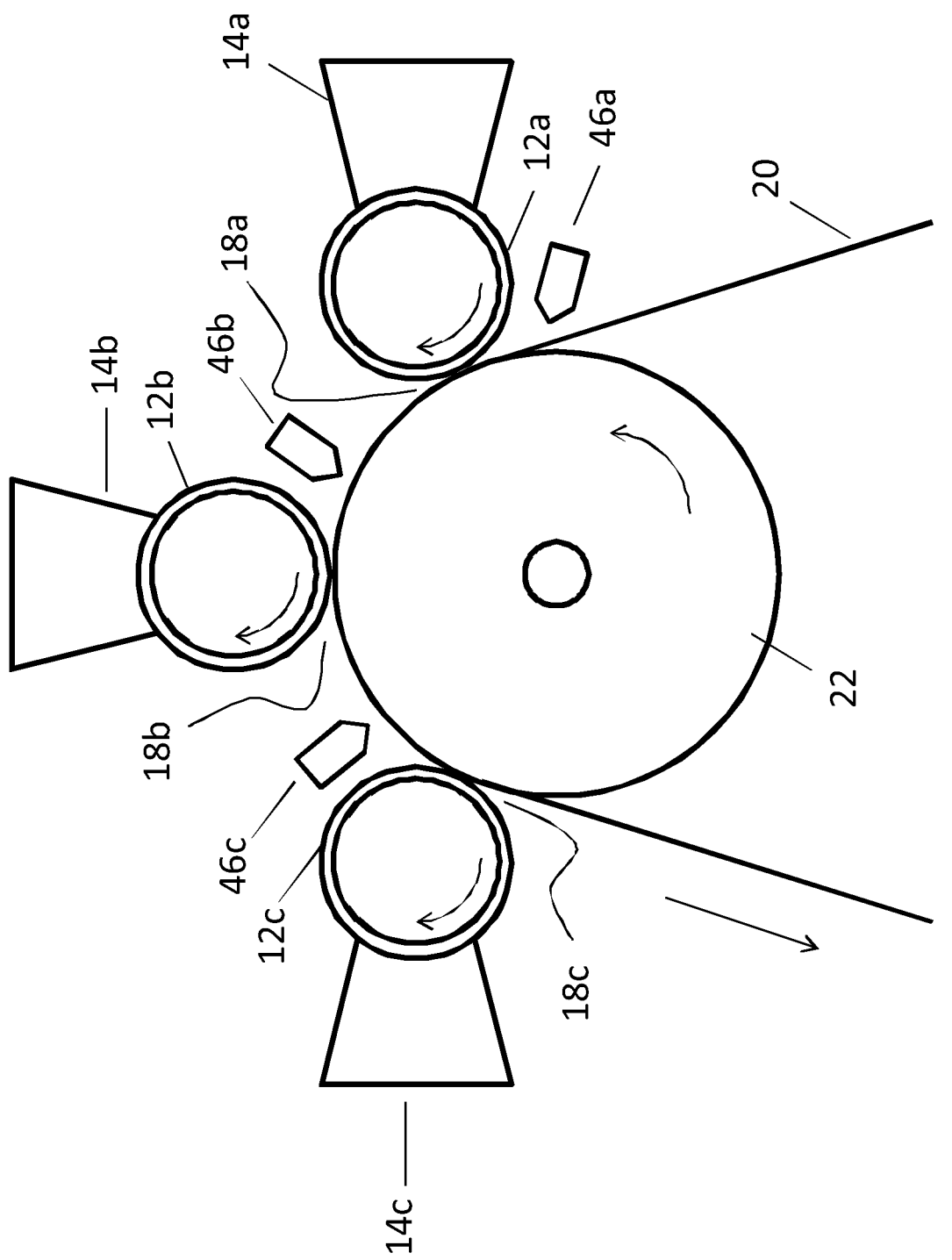

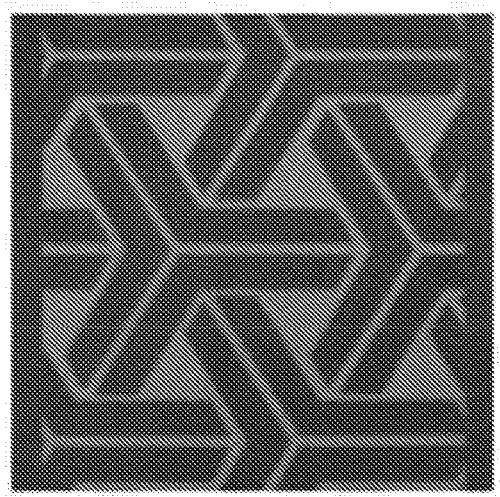
Fig. 6A
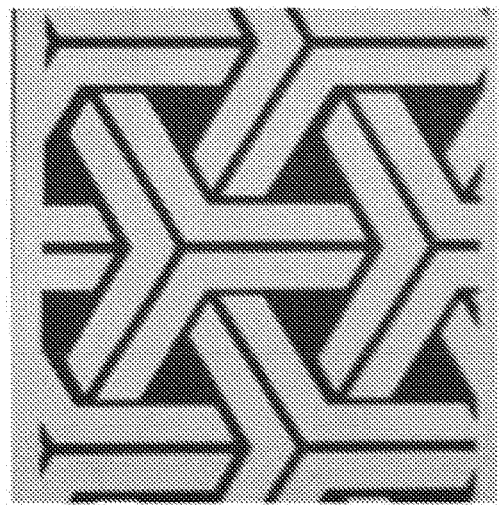
Fig. 6B
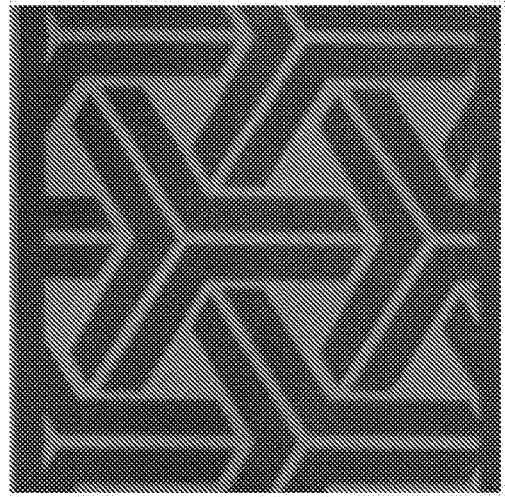
Fig. 6C
Fig. 6D

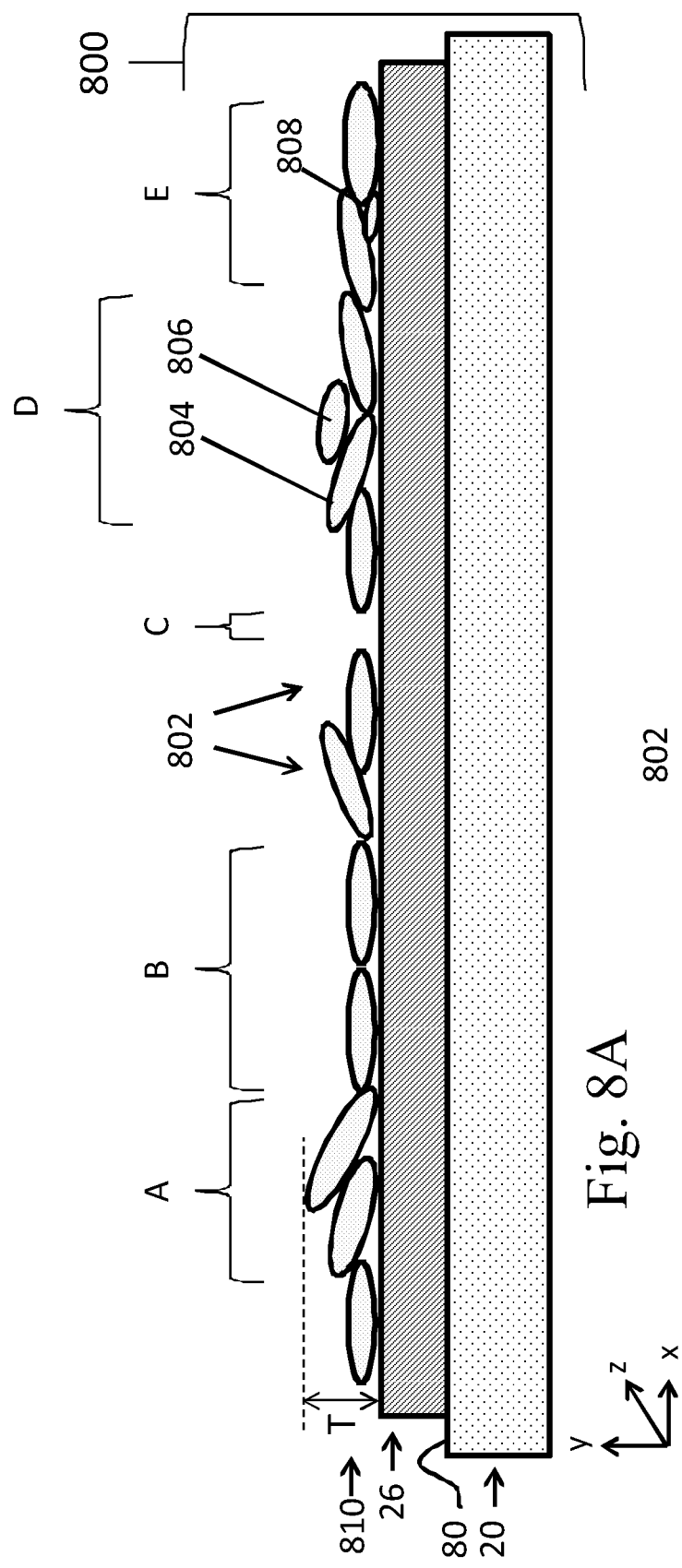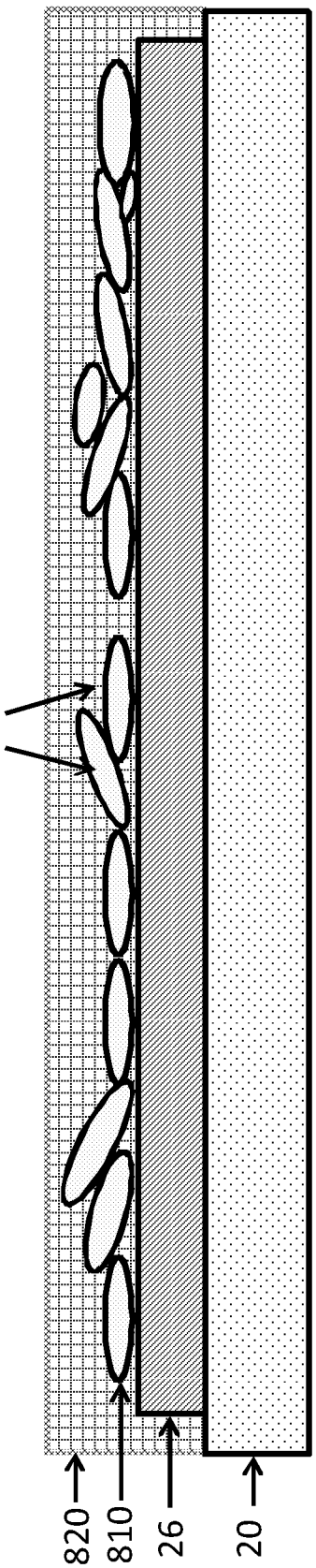

PRINTING SYSTEM AND METHOD

CROSS-REFERENCE TO RELATED APPLICATIONS

This application is a U.S. national phase application filed under 35 U.S.C. § 371 of International Application No. PCT/IB2016/053145, filed May 27, 2016, designating the United States and claiming priority to British Patent Application No. 1509080.6, filed May 27, 2015; British Patent Application No. 1514618.6, filed Aug. 17, 2015; British Patent Application No. 1514619.4 filed Aug. 17, 2015; and British Patent Application No. 1603997.6, filed Mar. 8, 2016.

FIELD

The present disclosure relates to a printing system and method, and in particular to a system and method capable of applying to a substrate a layer having a metallic appearance.

BACKGROUND

Of the numerous systems that have been proposed in the past for printing on a substrate, such as paper, card of plastics film, the system that bears the closest resemblance to the system proposed herein is foil imaging, which falls into two broad categories. In hot foil blocking, also known as foil stamping, a heated die is stamped onto a foil that is placed against the substrate. The foil has a coating, often of metal, and the application of heat and pressure causes the coating to adhere to the substrate so as to leave the design of the die on the substrate. At the same time, the metal coating is removed to leave behind on the foil a depleted region of the corresponding shape. Foil fusing or cold foil stamping is a related process avoiding the need for a die, wherein the foil is bonded to an image area that is covered by an adhesive. The adhesive image can be created by indirect printing, using printing plates or cylinders, as in offset, flexographic and gravure printers, using printing screens, as in serigraphic printers, or by direct printing, using image specific patterns, as in digital printers. For example of the latter, an adhesive can be applied to the substrate (e.g., by ink jetting) and, if needed, subsequently be activated (e.g., by heat) to adhere to the foil, hence binding it to the substrate in the desired pattern. Such foils typically comprise, layered in the following order, a carrier film, a release layer, enabling the separation of a following pigment or metal layer upon impression, and an adhesive layer facilitating the attachment of the preceding color-imparting layer to the printing substrate. Additional layers can be intercalated in this basic structure, such as a lacquer between a release layer and a metal layer, for example. Though such metal foils can be tens of micrometers thick, the thickness of the fully continuous metal layer or film in such laminated foils is generally of a few micrometers, typically less than one, some metal foils even providing a thin integral metal coat of less than one hundred nanometers.

One of the main disadvantages of foil stamping and fusing is the large amount of foil that is wasted during each stamp/fuse process, as any foil area that is not transferred to form the desired image on the substrate cannot be recovered for successive prints. Since foils, especially metal foils are expensive, foil imaging processes are relatively high cost methods, as typically a roll of foil can only be used once and, when discarded, only a small fraction of the coating will have been used.

OBJECT

The present disclosure seeks inter alia to provide a printing method and system that represent an effective alternative to foil imaging but that is more cost effective and environmentally friendly, possibly providing different physical properties to printed matter. Additionally, the method herein disclosed may be used for the preparation of coated substrates.

SUMMARY

According to a first aspect of the disclosure, there is provided a method of printing onto a surface of a substrate, which comprises providing a donor surface, passing the donor surface through a coating station from which the donor surface exits coated with a monolayer of individual particles, and repeatedly performing the steps of:

(i) treating the substrate surface to render the affinity of the particles to at least selected regions of the substrate surface greater than the affinity of the particles to the donor surface, (ii) contacting the substrate surface with the donor surface to cause particles to transfer from the donor surface only to the treated selected regions of the substrate surface, thereby exposing regions of the donor surface from which particles are transferred to corresponding regions on the substrate; and (iii) returning the donor surface to the coating station to render the particle monolayer continuous in order to permit printing of a subsequent image on a substrate surface.

It will be appreciated that as in the present printing method the particles form a monolayer on the donor surface, the particles transferred therefrom also form a monolayer on the selected regions of the substrate surface. The regions of the substrate suitably treated may be said to have a receptive layer.

The above method can be used repeatedly to create multiple copies of a same image or of different images on the relevant surfaces of one or more substrates. A series of identical images printed on a same substrate is typically referred to as a "print job".

The method herein disclosed may further include a cleaning step, during which particles remaining on the donor surface after contacting the substrate are removed from the donor surface, so that prior to the next passage through the cleaning station the donor surface is substantially devoid of particles. Such cleaning step may be performed during each printing cycle or periodically, for instance in between print jobs, changes of particles and the like. A printing cycle corresponds to the time period in-between subsequent passing of a reference point on the donor surface through the coating station, such passage resulting from the donor surface being movable with respect to the coating station.

The donor surface coated with particles is used in a manner analogous to the foil used in foil imaging. However, unlike foil imaging, the damage caused to the continuity of the particle layer on the donor surface by each impression can be repaired by re-coating only the exposed regions of the donor surface from which the previously applied layer has been stripped by transfer to the selected regions of the substrate.

The reason that the particle layer on the donor surface can be repaired after each impression is that the particles are selected to adhere to the donor surface more strongly than they do to one another. This results in the applied layer being substantially a monolayer of individual particles. The term "monolayer", defined more rigorously herein-below, is used herein to describe a layer in which—ideally—each particle has at least a portion that is in direct contact with the donor surface prior to impression and at least a portion in contact with the substrate after impression. While some overlap may occur between particles contacting any such surface, the layer may be only one particle deep over a major proportion of the area of the surface. This occurs for the same reason that an adhesive tape, when used to pick up a powder from a surface, will only pick up one layer of powder particles. When the adhesive tape is still fresh, the powder will stick to the adhesive until it covers the entire tape surface. However, once the adhesive has been covered with powder, the tape cannot be used to pick up any more powder because the powder particles will not stick strongly to one another and can simply be brushed off or blown away from the tape. Similarly, the monolayer herein is formed from the particles in sufficient contact with the donor surface and is therefore typically a single particle thick. Contact is said to be sufficient when it allows the particle to remain attached to the donor surface at the exit of the coating station, e.g., following surplus extraction, burnishing, or any other like step, some of which will be described in more detail below, by way of example.

Taking, for example, a platelet shaped particle contacting the donor surface over most of its planar face (e.g., being substantially parallel), the resulting thickness of the monolayer (in the direction perpendicular to the surface) would approximately correspond to the thickness of the particle, hence the average thickness of the monolayer can be approximated by the average thickness of the individual particles forming it. However, as there could be partial overlaps between adjacent particles, the thickness of the monolayer can also amount, in some places, to a low multiple of the dimension of the constituting particles, depending on the type of overlap, for instance on the relative angles the particles may form with one another and/or with the donor surface and/or the extent of the overlap. A monolayer may therefore have a maximum thickness (7) corresponding to about one-fold, or about two-fold, or about three-fold, or any intermediate value, of a thinnest dimension characteristic to the particles involved (e.g., the thickness of the particles for flake shaped ones or essentially the particle diameter for spherical ones). The thinnest characteristic dimension of a particle, or population thereof, may generally be estimated by microscope techniques, for instance from SEM or SEM-FIB images, and can be quantitatively determined for each particle, or for the entire field of view of the image.

Because the layer is a monolayer mosaic of particles, if the surface on entering the coating station already carries a particle layer which is discontinuous (because particles have been stripped from selected regions of a previously applied continuous layer), then the depleted regions alone can be replenished with particles without depositing fresh particles on those regions of the previously applied layer that are still intact. However, parts of the monolayer coating that are not used in one printing cycle may be removed from the donor surface (and possibly recycled) and the donor surface may be cleaned before a new monolayer is applied for the next printing cycle. This could be desirable if the physical interactions that occur during image impression somehow modify the properties of the donor surface, resulting in a ghost image being printed during the following operating cycle. A cleaning, and a possible treatment step, would in such a case ensure that the donor surface is restored to its original state at the commencement of each operating cycle.

For a relatively light effect or matte appearance, the area coverage by the mosaic of particles can be smaller (e.g., below 50%) than for glossy or mirror-like appearance. For such high gloss visual appearance, the mosaic of particles can sufficiently cover the target surface so that the reflection resulting from the particles transferred to the substrate is suitable for the desired visual effect. For the same effect, and assuming all other parameters are equivalent, particles having a relatively higher reflectivity and/or more parallel orientation with the printing substrate may only need to cover a smaller percent area of the target surface than particles having a relatively lower reflectivity and/or a more random/less parallel orientation relative to the substrate. The relative reflectivity relates to the properties of the respective particles and can also be affected by the characteristics of the substrate, features of the background image, and any such considerations readily understood by persons skilled in the art of metal printing. By "sufficient" covering, it is meant that the coat of particles on the relevant substrate regions will be devoid of defects perceptible to the naked eye, such as discontinuities or holes in the mosaic of particles that would expose the substrate surface to an extent visually detectable and detrimental to the intended effect. Having at least 50% of the area of the surface of the selected substrate region(s) to be coated, or at least 60%, or at least 70% of this area covered by particles may be sufficient coverage (i.e., providing for a sufficiently continuous layer of particles).

For high end mirror-like appearance substantially the whole of the selected surfaces of the substrate to be coated may need to be covered. By "substantially" covering, it is meant that, as for sufficient covering, the coat of particles on the relevant substrate regions will be devoid of visible defects, such as discontinuities or holes in the mosaic of particles that would expose the substrate surface to an extent detectable by the naked eye. Having at least 80% of the area of the surface of the selected substrate region(s) to be coated by particles, or at least 85%, or at least 90% or at least 95% of the area covered by particles is considered a substantial coverage (i.e., providing for a substantially continuous layer of particles).

As such sufficiently or substantially continuous layers of particles on the substrate surface, or part thereof, results from the transfer of same particles from the donor surface, it is to be understood that a sufficiently coated donor surface will correspondingly have at least 50%, or at least 60%, or at least 70% of its area covered by particles, while a substantially fully coated donor surface will correspondingly have at least 80%, or at least 85%, or at least 90% or at least 95% of its area covered by particles. As mentioned, for lower end effect, an area coverage of less than 50% can be satisfactory. Thus depending on the desired effect and on the particles involved, a monolayer of up to 50% area coverage can be used according to the present teachings. Depending on the surface being considered, the percent area coverage can be of at least 10%, or at least 20% or at least 30%.

For matte effects, the particle can be selected to provide such a look or can be oriented on the printing substrate in a manner providing such effect. As readily understood, particles being non-parallel with the surface of a substrate, even if being reflective, may diffract light in a way resulting in an overall matte effect. A matte effect can therefore be achieved by using a substrate having a relatively rough surface, a relatively thin receptive layer maintaining the roughness of the particle reception surface or any other substrate with a relatively thick receptive layer, the particle reception surface being patterned to provide for a surface roughness providing such "non-parallel" or random orientation of the particles and matte effect.

The percentage of an area covered by particles out of a specific target surface can be assessed by numerous methods known to skilled persons, including by determination of optical density possibly in combination with the establishment of a calibration curve of known coverage points, by measurement of transmitted light if either the particles or the substrate are sufficiently transparent, or conversely, by measurement of reflected light, for instance if the particles are reflective.

As used in the specification, a preferred method of determining the percentage area of a surface of interest covered by particles is as follows. Squared samples having 1 cm edges are cut from the surface being studied (e.g., from the donor surface or from the printed substrate). The samples are analyzed by microscopy (either laser confocal microscopy (Olympus, LEXT OLS30ISU) or optical microscopy (Olympus BX61 U-LH100-3)) at a magnification of up to ×100 (yielding a field of view of at least about 128.9 μm×128.6 μm). At least three representative images are captured in reflectance mode for each sample printed on an opaque substrate (e.g., paper). The captured images were analyzed using ImageJ, a public domain Java image processing program developed by the National Institute of Health (NIH), USA. The images are displayed in 8-bit, gray scale, the program being instructed to propose a threshold value of reflectance differentiating between the reflective particles (lighter pixels) and the interstices that may exist between neighboring or adjacent particles (such voids appearing as darker pixels). A trained operator may adjust the proposed threshold value, if needed, but typically confirms it. The image analysis program then proceed to measure the amount of pixels representing the particles and the amount of pixels representing the uncovered areas of the intra-particle voids, from which the percent area of coverage can be readily calculated. Measurements done on the different image sections of the same sample are averaged. When the samples are printed on a transparent substrate (e.g., a translucent plastic foil), a similar analysis can be done in transmittance mode, the particles appearing as darker pixels and the voids as lighter ones. Results obtained by such methods, or by any substantially similar analytical techniques known to those of skill in the art, are referred to as optical surface coverage, which can be expressed in percent or as a ratio.

If printing is to take place on the entire surface of the substrate, the receptive layer, which may for example be an adhesive, may be applied to the substrate by a roller before it is pressed against the donor surface. As the regions of a substrate suitably treated to receive particles being transferred from the donor surface, also said to harbor a corresponding receptive layer, can be an adhesive or act as the adhesive side of the tape illustration, the receptive layer may often also be referred to as an adhesive, this should not however be construed as limiting.

If printing is only to take place on selected regions of the substrate, on the other hand, then it is possible to apply the adhesive by any conventional printing method, for example by means of a die or printing plates, or by jetting the receptive layer onto the surface of the substrate. As a further possibility, it is possible to coat the entire surface of the substrate with an activatable receptive layer that is selectively rendered "tacky" by suitable activation means. Whether selectively applied or selectively activated, the receptive layer in such case forms a pattern constituting at least part of the image being printed on the substrate.

The term "tacky" is used herein only to indicate that the substrate surface, or any selected region thereof, has sufficient affinity to the particles to separate them from the donor surface and/or to retain them on the substrate, when the two are pressed one against the other at an impression station, and it need not necessarily be tacky to the touch. To permit the printing of patterns in selected regions of the substrate, the affinity of the receptive layer, activated if needed, towards the particles needs to be greater than the affinity of the bare substrate to the particles. In the present context, a substrate is termed "bare" if lacking a receptive layer or lacking a suitably activated receptive layer, as the case may be. Though the bare substrate should for most purposes have substantially no affinity to the particles, to enable the selective affinity of the receptive layer, some residual affinity can be tolerated (e.g., if not visually detectable) or even desired for particular printing effects.

The receptive layer may, for instance, be activated by exposure to radiation (e.g., UV, IR and near IR) prior to being pressed against the donor surface. Other means of receptive layer activation include temperature, pressure, moisture (e.g., for rewettable adhesives) and even ultra sound, and such means of treating the receptive layer surface of a substrate can be combined to render tacky the compatible receptive layer.

Though the nature of the receptive layer being applied to the surface of the substrate may differ, among other things, from substrate to substrate, with the mode of application and/or the selected means of activation, such formulations are known in the art and need not be further detailed for an understanding of the present printing method and system. Briefly, thermoplastic, thermosetting or hot-melt polymers compatible with the intended substrate and displaying sufficient tackiness, relative affinity, to the envisioned particle, optionally upon activation, can be used for the implementation of the present disclosure. Preferably the receptive layer is selected so that it does not interfere with the desired printing effect (e.g., clear, transparent, and/or colorless).

A desired feature of the suitable adhesives relates to the relatively short time period required for activating the receptive layer, i.e. selectively changing the receptive layer from a non-tacky state to a tacky state, increasing the affinity of the selected region of the substrate so that it becomes sufficiently attached to the particles to separate them from the donor surface. Fast activation times enable the receptive layer to be used in high-speed printing. Adhesives suitable for implementation of the present disclosure are preferably capable of activation within a period of time no longer than the time it takes the substrate to travel from an activating station to the impression station.

In some embodiments, activation of the receptive layer can take place substantially instantaneously at the time of the impression. In other embodiments, the activation station or step may precede the impression, in which case the receptive layer can be activated within a time period of less than 10 seconds or 1 second, in particular in a time period of less than about 0.1 second and even less than 0.01 second. This time period is referred to herein as the receptive layer's "activation time."

A receptive layer requiring activation to gain sufficient affinity, needs to remain in such state long enough to at least allow transfer of the particles from the donor surface to the printing substrate before the receptive layer loses its tackiness. In some printing systems the receptive layer may be applied on each substrate "in-line" upstream of the impression station, so as to be deposited in tacky form. The period of time during which the receptive layer is sufficiently tacky for the intended system is described herein as the "open time" of the receptive layer. Suitable adhesives exhibit an open time commensurate with the transfer conditions and/or the subsequent stations or steps of the particular printing system or process. If, for instance, the printing system is to comprise a plurality of coating stations, it is desired that the receptive layer selectively activated at or prior to reaching a first station revert to a non-tacky state before it reaches a second coating station at which the treatment of the substrate could be applied to a different portion, most likely to adhere to particles having different properties (e.g., different colors). In some printing systems, the receptive layer may be constantly tacky, its "infinite" open time being de facto limited by the subsequent application of the particles, which block its later ability to further adhere to additional particles.

Generally open times of activated adhesives are suitably of at least from about 0.01 second to a few seconds (e.g., up to 10 seconds), though longer open times (e.g., of a few minutes) may be suitable for certain applications and "infinite" open times can be suitable when the receptive layer is being applied in tacky stage (in other words, "already activated") in a desired pattern upstream of the impression station (e.g., the substrate is treated by deposition of a tacky material on its surface).

Independently of the printing method having been used to apply or activate the receptive layer to the image receiving side of a substrate, such application or activation being optionally selective so as to form a desired pattern, a suitable receptive layer may be selected as follows.

As already mentioned, a suitable receptive layer needs have sufficient affinity with the particles due to form the monolayer according to the present teachings. This affinity, which can be alternatively considered as an intimate contact between the two, needs to be sufficient to retain the particles on the surface of the receptive layer and can result from the respective physical and/or chemical properties of the layer and the particles. For instance, the receptive layer may have a hardness sufficiently high to provide for satisfactory print quality, but sufficiently low to permit the adhesion of the particles to the layer. Such optimum range can be seen as enabling the receptive layer to be "locally deformable" at the scale of the particles, so as to form sufficient contact. Such affinity or contact can be additionally increased by chemical bonding. For instance, the materials forming the receptive layer can be selected to have functional groups suitable to retain the particles by reversible bonding (supporting non-covalent electrostatic interactions, hydrogen bonds and Van der Waals interactions) or by covalent bonding. Likewise, the receptive layer needs be suitable to the intended printing substrate, all above considerations being known to the skilled person.

The receptive layer can have a wide range of thicknesses, depending for example on the printing substrate and/or on the desired printing effect. A relatively thick receptive layer can provide for an "embossing" aspect, the design being raised above the surface of the surrounding substrate. A relatively thin receptive layer can follow the contour of the surface of the printing substrate, and for instance for rough substrates enable a matte aspect. For glossy aspect, the thickness of the receptive layer is typically selected to mask the substrate roughness, so as to provide an even surface. For instance, for very smooth substrates, such as plastic films, the receptive layer may have a thickness of only a few tens of nanometers, for example of about 100 nm for a polyester film (for instance a polyethylene terephthalate (PET) foil) having a surface roughness of 50 nm, smoother PET films allowing to use even thinner receptive layers. Substrates having rougher surfaces in the micron, or tens of microns, range will benefit of a receptive layer having a thickness in the same size range or order of size range, if glossy effect, hence some leveling/masking of substrate roughness is desired. Therefore depending on the substrate and/or desired effect, the receptive layer can have a thickness of at least 10 nm, or at least 50 nm, or at least 100 nm, or at least 500 nm, or at least 1,000 nm. For effects that can be perceptible by tactile and/or visual detection, the receptive layer may even have a thickness of at least 1.2 micrometers ($\mu$m), at least 1.5 $\mu$m, at least 2 $\mu$m, at least 3 $\mu$m, at least 5 $\mu$m, at least 10 $\mu$m, at least 20 $\mu$m, at least 30 $\mu$m, at least 50 $\mu$m, or at least 100 $\mu$m. Though some effects and/or substrates (e.g., cardboard, carton, fabric, leather and the like) may require receptive layers having a thickness in the millimeter range, the thickness of the receptive layer typically does not exceed 800 micrometers ($\mu$m), being at most 600 $\mu$m, at most 500 $\mu$m, at most 300 $\mu$m, at most 250 $\mu$m, at most 200 $\mu$m, or at most 150 $\mu$m.

After printing has taken place, namely after the particles are transferred from the donor surface to the tacky regions of the treated substrate surface (i.e., the receptive layer) upon pressing, the substrate may be further processed, such as by application of heat and/or pressure, to fix or burnish the printed image and/or it may be coated with a varnish (e.g., colorless or colored transparent, translucent, or opaque overcoat) to protect the printed surface and/or it may be overprinted with an ink of a different color (e.g., forming a foreground image). While some post-transfer steps may be performed on the entire surface of the printed substrate (e.g., further pressure), other steps may be applied only to selected parts thereof. For instance, a varnish may be selectively applied to parts of the image, for instance to the selected regions coated with the particles, optionally further imparting a coloring effect.

Such elective overcoats, which may cover and optionally seal at least regions of the substrate coated with the monolayer of particles, advantageously can satisfactorily adhere to the particles and/or be compatible with the receptive layer underneath said monolayer. Attachment of the overcoat to the particles can be optionally enhanced by physical treatment of the surface with plasma or a corona discharge. In embodiments wherein the receptive layer requires post-impression treatment, the overcoat preferably enables such treatment. If, for example, a particular receptive layer requires final UV-curing following transfer of particles thereupon, an overcoat applied upon the particles needs to permit the transmission of the UV radiation necessary to achieve such curing.

Any device suitable to perform any such post-transfer step can be referred to as a post-transfer device (e.g., a coating device, a burnishing device, a pressing device, a heating device, a curing device, and the like). Post-transfer devices may additionally include any finishing device conventionally used in printing systems (e.g., a laminating device, a cutting device, a trimming device, a punching device, an embossing device, a perforating device, a creasing device, a binding device, a folding device, and the like). Post-transfer devices can be any suitable conventional equipment, and their integration in the present printing system will be clear to the person skilled in the art without the need for more detailed description.

The particles may include any material to be applied to the surface of the substrate. In particular, suitable material for the particles may include compounds providing for a desired printing effect and encompass coloring agents (e.g., pigments and dyes) generally bound to a polymeric resin (e.g., a non-thermoplastic polymer) and any other material having a desired printing effect (e.g., providing a metallic look or a glittering effect etc.).

As the effect to be achieved is similar to foil imaging, such as used for instance for metal printing, then the particles may be grains or flakes of metals, such as aluminum, copper, iron, zinc, nickel, tin, titanium, gold or silver, or alloys, such as steel, bronze or brass, and like compounds predominantly including metals. In addition to being made of real metals, suitable particles can be made of compounds providing for a similar visual effect (e.g., made of a polymeric or ceramic material having a metallic appearance). Such "metal-like" materials are typically predominantly non-metallic, a metal coat optionally serving to provide the light reflectivity that may be perceived as metallic. By way of example, particles manufactured using the PVD (physical vapor deposition) method, wherein a polymer foil is vapor coated in vacuum with the metal of interest (including chrome, magnesium and the above-mentioned exemplary metals) and thereafter crushed to form individual flakes, may form metal-like particles if the polymer backbone is retained and can be deemed "metallic" if the polymer is eliminated following the deposition process.

If the effect to be achieved includes a glittering and/or a pearlescent and/or a nacreous effect, synthetic high polymers (including for example multi-layered structures of polyacrylates), magnesium fluoride, muscovite, aragonite, rutile or anatase titanium dioxide, mica compounds (typically coated with metal oxides) and the like can be used for the particles. All of the foregoing exemplary particles, including the genuinely metallic particles though collectively termed for simplicity "metal-looking" particles (i.e., providing a visual effect similar to a metallic compound), may be coated or uncoated.

The coating of the particles, which can be applied by physical but more typically chemical means, can, among other things, reduce or prevent the particles sticking to one another (e.g., as achievable with anti-caking agents and the like), increase the repulsion between the particles (e.g., as achievable by increasing the charge of the particles), protect the particles from undesired chemical modification (e.g., reduce, prevent or delay the oxidation of metals and alloys or any other deleterious aging of the metal-looking particles) or further increase the affinity of the particles to the donor surface or to the selected regions of the substrate, as desired (e.g., modify the hydrophobicity of the coats/surfaces).

Without wishing to be bound by theory, it is believed that the particles may have a tendency to adhere to the donor surface not only on account of the interaction between two different hydrophobic surfaces but also as a result of a charge based interaction. It may therefore be possible to enhance the affinity between the particles and the donor surface by subjecting the donor surface for a conditioning treatment, such as exposure to a corona discharge or application of a chemical treatment solution. Any such treatment can be performed by a suitable conditioning device.

Particles suitable for a printing system and method according to the present teachings may for example be coated by one or more of i) an unmodified or modified carboxylic acid or fatty acid, the carboxylic acid selected from the group comprising, but not limited to, stearic acid, palmitic acid, behenic acid, benzoic acid, and oleic acid; ii) an oily substance selected from the group comprising, but not limited to, vegetal oils, such as linseed oil, sunflower oil, palm oil, soya oil, and coconut oil; mineral oils and synthetic oils; and iii) an oxide which may be of same or different material as the core particle being coated. For instance, aluminum particles may be coated with an aluminum oxide or a silicon dioxide, and mica particles may be coated with titanium dioxide and iron oxide, for example. The particle coating may optionally modify the coloring effect of the core particle, this can be achieved for instance with some metal oxides or with pigmented polymers (e.g., a polyacrylate containing inorganic or organic absorption pigments). Such coloring effect can also result from the choice of the core particle, or from a partial oxidation of the same.

Whether colored polymers or metal-looking, the particles may provide, once transferred to the printing substrate, for a glossy or matte image, and for any other type of desired effect in accordance with the selected particles.

According to a further aspect of the disclosure, there is provided a printing system comprising:

a continuously circulating endless donor surface, a coating station for applying particles to the donor surface, the donor surface bearing a monolayer coating of individual particles on exiting the coating station, a treatment station at which a substrate surface is treated to produce selected regions of the substrate surface having an affinity to the particles on the donor surface that is greater than the affinity of the particles to the donor surface, and an impression station at which the substrate surface contacts the donor surface to cause particles to transfer from the donor surface to only the selected regions of the substrate surface, thereby exposing corresponding regions of the donor surface, wherein after passing through the impression station, the donor surface returns, during operation, to the coating station for the layer of particles to be rendered continuous by the application of fresh particles to the exposed regions of the donor surface.

It is possible for the coating station to be static, while the donor surface is cyclically movable, being either the outer surface of a rotatable drum, or of an endlessly circulating belt or even of a plate moving back and forth so as to ensure his surface is exposed to the coating station from edge to edge. All such forms of donor surfaces can be said to be movable (e.g., cyclically, endlessly or repeatedly movable) with respect to the coating station where particles can be applied to the donor surface, the donor surface bearing a monolayer coating of individual particles on exiting the coating station (having completed a cycle). The passing of the donor surface through a coating station or the donor surface being continuously circulating therein can be achieved by any such movable donor surface.

In some embodiments, the coating station comprises a supply of particles suspended in a fluid, the particles adhering more strongly to the donor surface than to one another, an application device for applying the fluid to the donor surface in a manner to cause the particles suspended in the fluid to adhere to the donor surface so as to form a particle coating on the surface, and a surplus extraction system operative to extract fluid and to remove surplus particles that are not in direct contact with the surface, so as to leave only a monolayer of particles adhering to the donor surface on exiting the coating station.

The application device may comprise a spray head for spraying the fluid and suspended particles directly onto the donor surface. Alternatively, the application device may comprise a rotatable applicator operative to wipe the fluid and suspended particles onto the surface. When the particles are applied by the application device in a liquid fluid, the device may further comprise, if needed, a drying element enabling the particle coating to be substantially dry by the time it reaches a subsequent station. In some embodiments, the particles on the donor surface are substantially dry upon contacting of the receptive layer on the substrate at the impression station.

In the present disclosure, the term "suspended in" and its variations is to be understood as "carried by" and like terms, not referring to any particular type of mixture of materials of same or different phase.

The printing system may be an offline, stand-alone machine, or may be in-line with a printing press and/or other finishing units. For instance, the printing system according to the present disclosure can serve as one station or module in offset, flexographic, gravure, serigraphic and digital printing presses.

Additionally, a printing system according to the present teachings may comprise, upstream of the coating station, more than a station for applying a receptive layer or treating the substrate to form it. For instance, the system may include a station for applying a background image, the receptive layer being subsequently applied or activated thereupon to form (following impression) a foreground image on the previously applied background. Conversely, the receptive layer can form a background image, whereas a foreground image is thereafter applied. The foreground and background images may form distinct parts of the image to be printed, but may also overlap. Each of the foreground and background images, if both are desired for a particular image to be printed, can be applied by any printing system.

For instance, a background image can be applied at a first station for flexographic printing of a colored surrounding, and a receptive layer can be applied at a second station, in a manner that may either at least partially overlap with the background image or in a separate non-overlapping region of the substrate.

The above-described printing method and printing system can have a wide range of uses in commercial and decorative printing, including in the publishing and packaging industry, where they can serve, for instance, to create decorative finishes (e.g., in luxury packaging) and anti-counterfeiting measures (e.g., in bank notes).

BRIEF DESCRIPTION OF THE DRAWINGS

Embodiments of the disclosure will now be described, by way of example, with reference to the accompanying drawings, in which:

FIG. 4 schematically illustrates an exemplary embodiment of a printing system having a plurality of impression stations according to the present disclosure;

FIGS. 6A to 6D are details of FIGS. 5A to 5D, respectively, drawn to an enlarged scale;

FIGS. 8A and 8B are schematic cross-section illustrations of printed constructions that can be produced using a printing system and method of the present disclosure;

DETAILED DESCRIPTION

The ensuing description, together with the figures, makes apparent to a person having ordinary skill in the pertinent art how the teachings of the disclosure may be practiced, by way of non-limiting examples. The figures are for the purpose of illustrative discussion and no attempt is made to show structural details of an embodiment in more detail than is necessary for a fundamental understanding of the disclosure. For the sake of clarity and simplicity, some objects depicted in the figures may not be drawn to scale.

Overall Description of the Printing System

Figure 1:
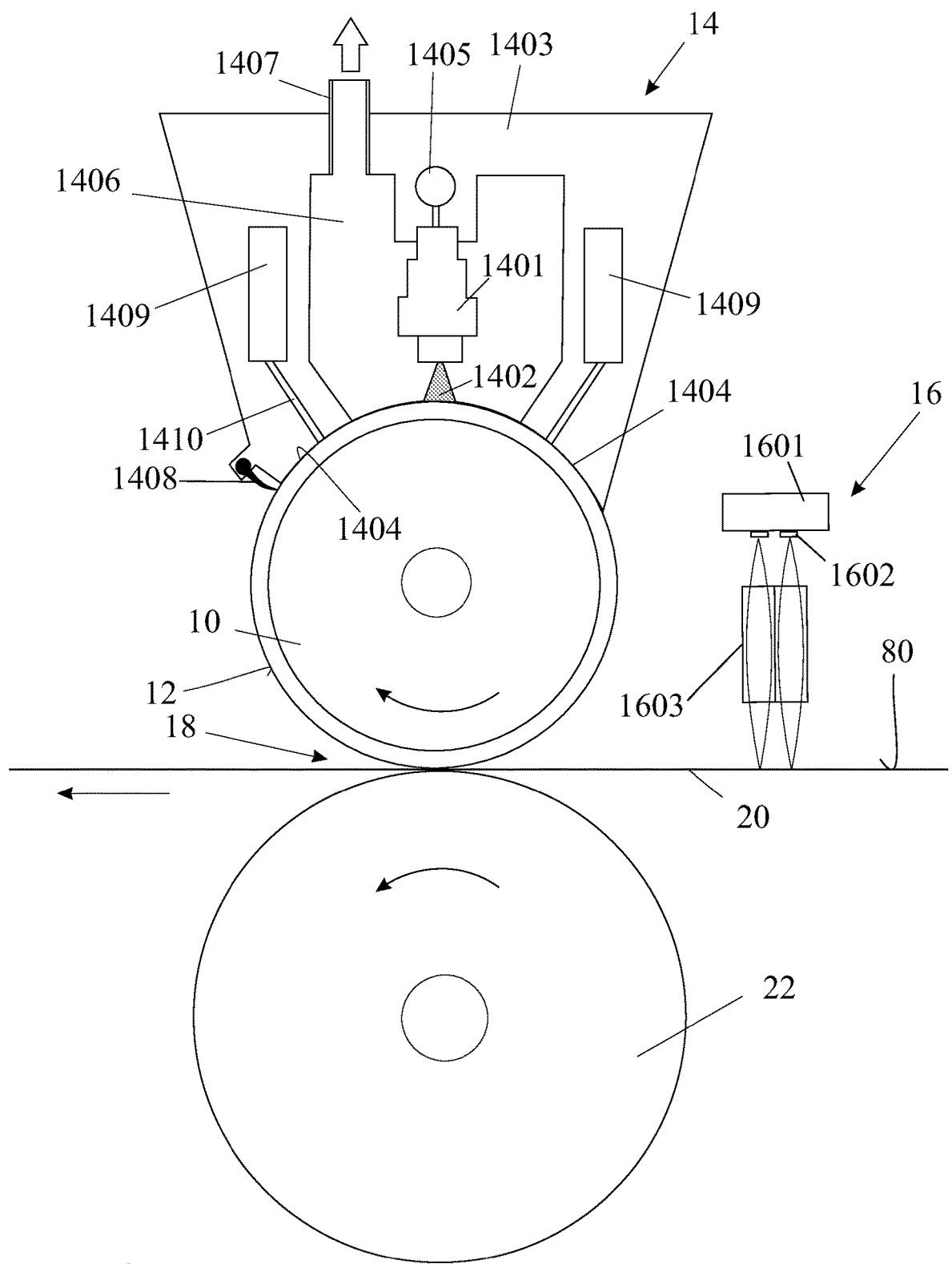
FIG. 1 depicts schematically an embodiment of a printing system of the present disclosure.

FIG. 1 shows a drum 10 having an outer surface 12 that serves as a donor surface. As the drum rotates clockwise, as represented by an arrow, it passes beneath a particle coating apparatus 14 where it acquires a monolayer coating of fine particles. Next, the surface passes through an impression station 18 where a printing substrate 20 is compressed between the drum 10 and an impression cylinder 22. The side of the printing substrate 20 to which the particles are transferred may be referred to as an image-receiving surface and is designated 80 in FIGS. 1 and 2. Selected regions of the surface of the printing substrate 20 are rendered tacky, for example in one of the ways described below, prior to coming into contact with the donor surface 12. This causes the monolayer of fine particles to adhere to the tacky regions of the substrate and to separate from the donor surface 12. The regions on the donor surface corresponding to the tacky areas or selected regions of the substrate bearing the receptive layer consequently become exposed, being depleted by the transfer of particles. The donor surface 12 can then complete its cycle by returning to the coating apparatus 14 where a fresh monolayer particle coating is applied only to the exposed regions from which the previously applied particles were transferred to the selected regions of the substrate 20 in the impression station 18.

Figure 2:
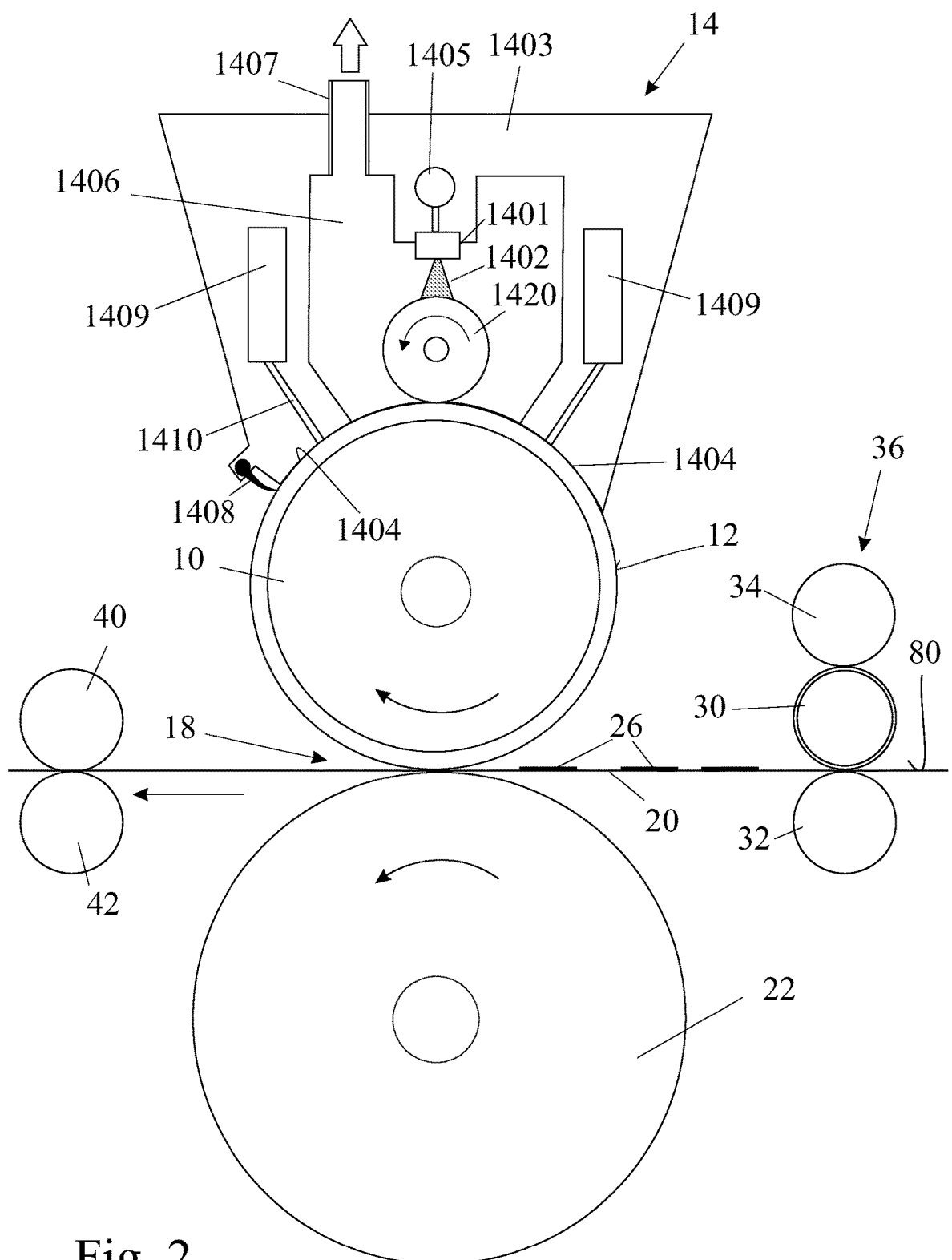
FIG. 2 is a view similar to that of FIG. 1 showing an embodiment having an alternative particle application device that includes a rotating applicator.

In the embodiment of FIG. 1, the substrate 20 carries a receptive layer (e.g., made of an adhesive) that is activated and rendered tacky in selected regions by exposure to radiation using as a treating station an imaging system 16, described in greater detail below. In the embodiment of FIG. 2, on the other hand, prior to contacting the donor surface 12, the substrate 20 passes through a treating station 36 between a die 30 and a roller 32. The die 30 has an embossed pattern that picks up an adhesive from an application roller 34 (e.g., an anilox roll) and places receptive layer 26 (e.g., an adhesive layer) on the substrate according to the die pattern. If printing is to cover the entire surface of the substrate 20, the die 30 may be replaced by a plain roller. The rollers 30, 32 and 34 may form additional types of rotating treating stations 36, and can for instance serve for the application and/or activation of a receptive layer by offset, rotogravure, flexography or rotating silkscreen printing. A treating station, as illustrated by imaging system 16 can be referred to as a digital treating station, while a treating station as illustrated by rotating system 36 can be referred to as an analog treating station.

The above examples also illustrate two options for the preparation of the substrate bearing the active (already tacky, with sufficient affinity to the particles) or "activatable" receptive layer or adhesive. In one case, such preparation can occur off-line, the printing system only requiring a substrate transport system able to feed such off-line prepared substrates to the impression station, wherein the activation occurs either downstream of the treating station wherein the receptive layer was applied or at the impression station. In another case, the addition of the receptive layer to the substrate or its activation can occur in-line with the other steps of the printing process.

Additional methods for selectively applying or activating an adhesive or any other type of receptive layer on a printing substrate are known, may be applicable as will be clear to the person skilled in the art and need not be detailed herein, the two aforementioned methods being non-limiting examples. For instance, the receptive layer can be applied at the treating station by silkscreen printing, and optionally further activated at a downstream activation station, preceding the impression station. Activation can for example involve curing of the receptive layer prior to the contacting of the particles. In some embodiments, curing (or further curing) may also serve as a post-transfer processing step (e.g., improving the immobilization of the particles on a curable receptive layer on the substrate).

The Particle Coating Apparatus

The particle coating apparatus 14 in the embodiment of FIG. 1 comprises a plurality of spray heads 1401 that are aligned with each other along the axis of the drum 10 and only one is therefore seen in the section of the drawing. The sprays 1402 of the spray heads are confined within a bell housing 1403, of which the lower rim 1404 is shaped to conform closely to the donor surface leaving only a narrow gap between the bell housing 1403 and the drum 10. The spray heads 1401 are connected to a common supply rail 1405 which supplies to the spray heads 1401 a pressurized fluid carrier (gaseous or liquid) having suspended within it the fine particles to be used in coating the donor surface 12. If needed the suspended particles may be regularly or constantly mixed, in particular before their supply to the spray head(s). The particles may for instance be circulated in the coating apparatus within a flow rate range of 0.1 to 10 liter/minute, or in the range of 0.3 to 3 liter/min. The fluid and the surplus particles from the sprays heads 1401, which are confined within a plenum 1406 formed by the inner space of the housing 1403, are extracted through an outlet pipe 1407, which is connected to a suitable suction source represented by an arrow, and can be recycled back to the spray heads 1401. Though herein referred to as spray heads, any other type of nozzle or orifice along the common supply pipe or conduit allowing applying the fluid suspended particles are encompassed.

It is important to be able to achieve an effective seal between the housing 1403 and the donor surface 12, in order to prevent the spray fluid and the particles from escaping through the narrow gap that must essentially remain between the housing 1403 and the donor surface 12 of the drum 10. Different ways of achieving such a seal are shown schematically in the drawing.

The simplest form of seal is a wiper blade 1408. Such a seal makes physical contact with the donor surface and could score the applied coating if used on the exit side of the housing 1403, that is to say the side downstream of the spray heads 1401. For this reason, if such a seal is used, it is preferred for it to be located only upstream of the spray heads 1401 and/or at the axial ends of the housing 1403. The terms "upstream" and "downstream" as used herein are referenced to points on the donor surface 12 as it passes through the coating station.

FIG. 1 also shows how egress of the fluid within which the particles are suspended from the sealing gap between the housing 1403 and the drum 10 can be prevented without a member contacting the donor surface 12. A gallery 1409 extending in the present illustration around the entire circumference of the housing 1403 is connected by a set of fine passages 1410 extending around the entire rim of the housing 1403 to establish fluid communication between the gallery 1409 and the sealing gap.

In a first embodiment, the gallery 1409 is connected to a suction source of a surplus extraction system, which may be the same suction source as is connected to the outlet 1407 or a different one. In this case, the gallery 1409 serves to extract fluid passing through the gap before it exits the housing 1403. The low pressure also sucks off the drum 10 any particles that are not in direct contact with the donor surface 12 and, if the sprayed fluid is a liquid, it also sucks off surplus liquid to at least partially dry the coating before it leaves the particle coating apparatus 14.

Surplus liquid can alternatively and additionally be removed by mean of a liquid extracting roller positioned on the exit side of the coating apparatus. Such a roller, schematically illustrated as 1440 in FIG. 3, which has on its outer surface 1442 sponge-like liquid absorbing properties (e.g., closed-cell foam), can be independently driven to rotate at a speed and/or in a direction differing from the speed and direction of drum 10 (only partially represented). The liquid extracting roller can contact the particles coated on the donor surface 12 and extract surplus liquid by drawing it within its fluid absorbing outer surface 1442, which is advantageously sufficiently smooth and even so as not to affect the layer of particles retained on the donor surface prior to their selective transfer to the substrate 20. As the extracting roller 1440 continues to rotate following the absorption of the surplus liquid, it approaches a wiper 1444, or any other suitable mean, positioned so as to squeeze the roller and release the extracted liquid out of its absorbing surface. A suction inlet, schematically represented by arrow 1446, can be positioned adjacent to such wiper, so as to permit the immediate removal of the liquid so extracted from the particle coated donor surface and so forced out of the roller outer surface. Following such elimination of the removed liquid, the roller 1440 can complete its cycle, contacting again the donor surface and further extracting surplus liquid. Though illustrated in FIG. 3 as being internal to a coating station 14 (i.e. within partially represented plenum 1406 of housing 1403), a liquid extracting roller 1440, if present, can alternatively be positioned downstream of the coating station, as long as it remains upstream of a station where liquid removal is desired. The liquid extracting roller and its afore-described associated elements can be collectively referred to as a liquid absorbing device.

As mentioned, the printing system may further comprise a dryer (e.g., hot or cold air blower) on the exit side of the coating apparatus 14, or further downstream, so as to allow the particle coat to reach a subsequent station in substantially dry form.

In an alternative embodiment, the gallery 1409 is connected to a source of gas at a pressure higher than the pressure in the plenum 1406. Depending on the rate of fluid supply to the plenum through the spray heads 1401 and the rate of extraction through the outlet 1407, the plenum 1406 may be at a pressure either above or below the ambient atmospheric pressure.

If the plenum is at sub-atmospheric pressure, then is suffices for the gallery 1409 to be at ambient atmospheric pressure, or indeed no gallery need be present. In this case, because the pressure within the sealing gap will exceed the pressure in the plenum 1406, gas flow through the gap will be towards the interior of the housing with no risk of fluid egress.

If the plenum is at above atmospheric pressure, then the gallery 1409 may be connected to a pressurized gas supply, preferably air. In this case, air will be forced into the sealing gap under pressure through the passages 1410 and will split into two streams. One stream will flow towards the plenum 1406 and will prevent egress of the fluid within which the particles are suspended. That stream will also dislodge and/or entrain particles not in direct contact with the donor surface and assist in at least partially drying the coating if the carrier fluid is a liquid. The second stream will escape from the coating apparatus without presenting a problem as it is only clean air without any suspended particles. The second gas stream may also assist in further drying of the particle coating on the donor surface 12 before it leaves the coating apparatus 14. If desired, the gas stream can be heated to facilitate such drying.

In an alternative embodiment, the afore-mentioned gallery 1409 does not extend around the entire circumference of the housing, so as to seal the plenum 1406 on all sides. It can be a "partial" gallery or a combination of one or more air knives (with negative or positive flow) positioned either downstream or upstream of the spray head(s) and/or intermediate applicator(s) in parallel to the axis of the drum and/or on the lateral edges of the spray heads and/or applicators in a direction perpendicular to the axis of the drum. A "partial" gallery on the exit side may, in some embodiments, serve as gas blower (e.g., cold or hot air) additionally or alternatively facilitating the drying of the particles, in which case the passages 1410 may be adapted to provide sufficient flow rate.

In the embodiment illustrated in FIG. 2, instead of being carried in a fluid sprayed directly onto the donor surface 12, the suspended particles are applied by spray heads 1401 to an intermediate applicator 1420. The applicator 1420 may be for example a sponge-like roller, of which the axis is parallel to the axis of drum 10. The fluid and suspended particles may be sprayed onto the applicator 1420 in the manner shown in FIG. 2, or if the applicator is porous, or constructed in manner similar to the "brushes" used in automatic car washes that have loose fabric strips extending radially from a central axle, then the fluid may be introduced via the axle hub and allowed to escape through holes in the axle (not shown). The material of the roller or the fabric strip is to be "relatively soft", selected so as to wipe the particles on the surface, without affecting the integrity of the coat thereupon formed, in other words without scratching the layer of particles. The surface of the applicator, or of its bristles or stripes, may suitably comprise a closed-cell foam (such as such as closed cell polyethylene, closed cell PVA or closed cell silicone); or a relatively soft open-cell foam (such as a polyurethane foam); or a fabric, such as cotton, silk or ultra high molecular weight polyethylene (UHMWPE) fabric.

As the roller or brush 1420 rotates along its axis, it applies the particles upon contact with donor surface 12 of drum 10. The outer surface of the applicator 1420 need not have the same linear velocity as the donor surface and it can, for instance, be up to about ten-fold higher. It may rotate in the same direction as drum 10 or in counter-direction. The applicator may be independently driven by a motor (not shown, in FIG. 2), or driven by drum 10 by gears, belts, friction, and the like.

Figure 3:
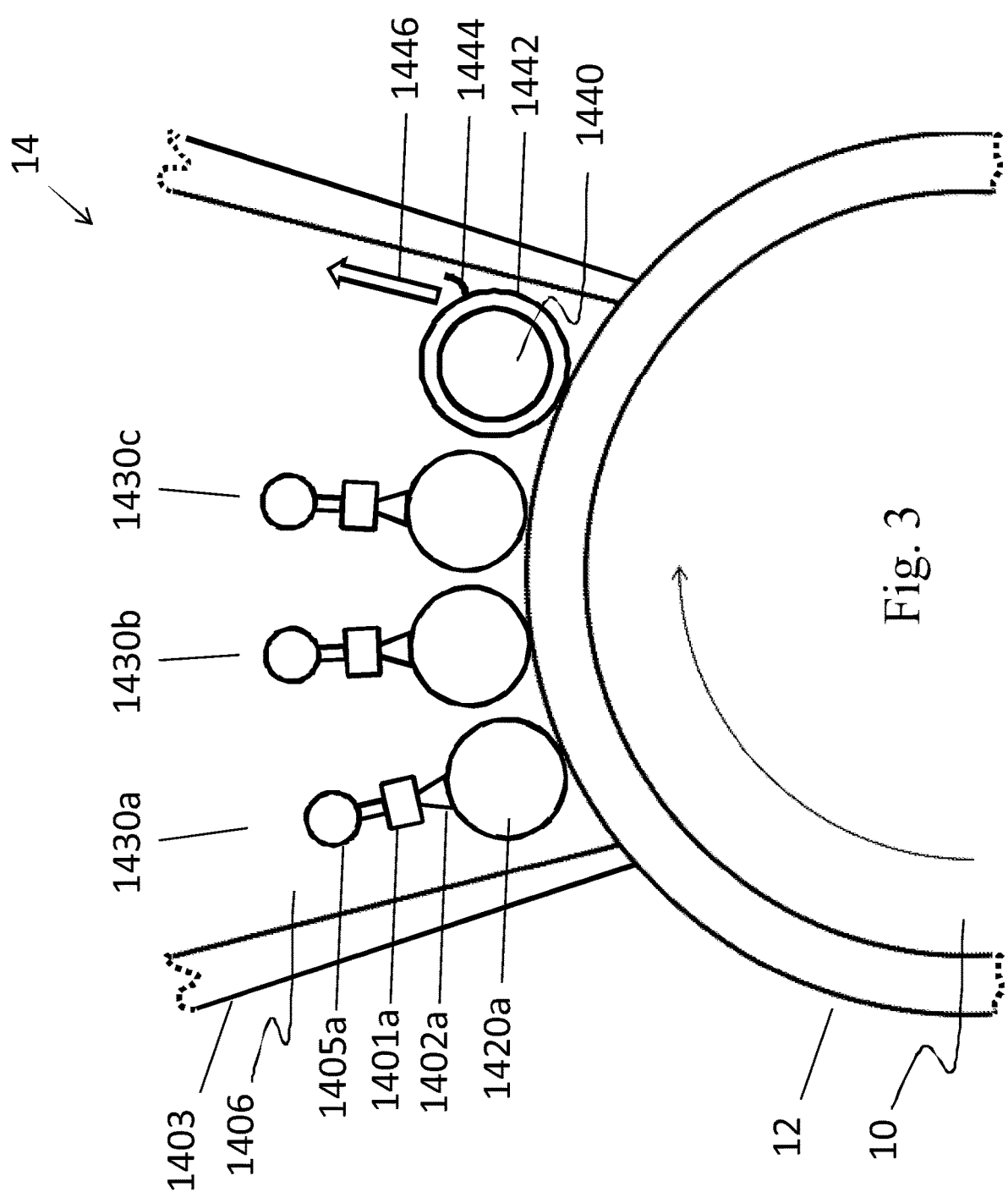
FIG. 3 schematically illustrates an exemplary embodiment of a coating station for a printing system according to the present disclosure.

The particle coating apparatus 14 may comprise more than one applicator 1420 of particles, e.g., two or three applicators, as schematically illustrated in FIG. 3. In the figure, showing a partial view of a coating station 14 and of a donor surface 12 mounted on a drum 10, three application stations 1430*a*, 1430*b* and 1430*c* are illustrated. Each such station, as detailed for 1430*a*, may have in addition to its applicator 1420*a*, its own supply of particles as applied by sprays 1402*a*, provided by spray heads 1401*a*, the relevant fluid being delivered by supply conduct 1405*a*. Such applicator(s) may optionally provide some burnishing or flattening of the particles on the donor surface, or such function, if desired, can be provided by a separate element, such as roller 40 described below.

The coating apparatus can also further comprise a cleaning roller. A cleaning roller can be similar in structure to an applicator roller, except that it would lack the supply of particles. A cleaning roller may for instance apply a liquid corresponding to the fluid carrier of the particles, but depleted of the latter. In the example illustrated in FIG. 3, stations 1430*a* and 1430*b* may serve to apply particles, while the applicator of 1430*c* may serve as cleaning roller. Alternatively, the cleaning roller, if present, may be positioned externally to the housing of the particles applicator(s), optionally in a separate housing with a distinct fluid supply and system for elimination and/or recirculation.

A cleaning device, if present, can be continuously operated. For instance, a cleaning roller as above-exemplified may serve to remove particles not in direct contact with the donor surface during any cycle of the surface in the coating station during operation of the printing system. Additionally, and alternatively, a cleaning device can be used periodically. Such a cleaning device may for instance be used for maintenance, and can serve to remove all particles from the entire donor surface. Such complete regeneration of the donor surface to be free of particles can be done intermittently or periodically, for example at the end of a print job, or when changing the particles to be printed (e.g., to a new batch or to a new type), or once a day, or once a week, or any other desired frequency. Periodical cleaning devices, which may rely on chemical or physical treatment of the donor surface achieving full particle removal, can be located externally to the coating station. They can be operated for at least one cycle of the donor surface.

The Particles

The shape and composition of the coating particle will depend in practice on the nature of the effect to be applied to the surface of the substrate 20. In a printing system seeking to achieve effects similar to foil printing, the particles may conveniently be formed of a metallic or metal-looking material. For printing of high quality, it is desirable for the particles to be as fine as possible to minimize the interstices between particles of the applied monolayer coating. The particle size is dependent upon the desired image resolution and for some applications a particle size (e.g., a diameter or maximum long dimension) of 10 µm (micrometers) or possibly even more (i.e. having a larger size) may prove adequate. The longest dimension of irregular platelets may even reach 100 µm on average. However, for improved image quality, it is preferred for the particle size to be a small fraction or a fraction of a micrometer and more preferably a few tens or hundreds of nanometers. Commercially available flakes may have a thickness of about 60-900 nm and a representative planar dimension (e.g., mean diameter for near round flakes or average "equivalent diameter" for platelets having less regular plane projection, also characterized by shortest/longest dimensions) of about 1-5 µm, but flakes can also be prepared with a thickness of as little as 15 nm, 20 nm, 25 nm, 30 nm, 40 nm, or 50 nm and a mean or equivalent diameter in the region of 100-1000 nm or 500-800 nm. When metal-looking particles are used, it is believed that over most of the practical size range, the smaller the particle size, the greater is the degree of shine that can be achieved and the closer one can approximate to a mirror-like finish when such particles have substantially the same orientation (e.g., when flake-like particles are to a large extent aligned with one another, so as to form a relatively even surface enhancing specular light reflection). However, the size of the particles need not be too small, since below a certain threshold, which typically depends on the chemical and/or physical nature of the particles, the particles may display undesired edge effects rendering them less suitable to the intended printing. Thus ideal size determination, which may depend upon the intended visual effect as well as other printing parameters (e.g., substrate and/or receptive layer roughness) or operating parameter of the printing system (e.g., impression pressure or burnishing shear and like factors), may be done empirically, by routine experimentation, by one of ordinary skill in the printing art.

Particles of both pigmented non-thermoplastic polymers and metal-looking materials may be used to achieve either a matte or a glossy look, and any intermediate look, once transferred to the printing substrate. Such look may, to some extent, be subsequently modified by additional steps (e.g., burnishing, varnishing, etc.)

Depending on their shape, which can be relatively regular or irregular, the particles may be characterized by their length, width, thickness, mean or equivalent diameter or any such representative measurement of their X-, Y- and Z-dimensions. Generally the dimensions of the particles are assessed on planar projections of their shape (e.g., vertical and/or horizontal projections). Typically such sizes are provided as average of the population of particles and can be determined by any technique known in the art, such as microscopy and Dynamic Light Scattering (DLS). In DLS techniques the particles are approximated to spheres of equivalent behavior and the size can be provided in term of hydrodynamic diameter. DLS also allows assessing the size distribution of a population. As used herein, particles having a size of, for instance, 10 µm or less, have at least one dimension smaller than 10 µm, and possibly two or even three dimensions, depending on shape. The particles are said to fulfill on average any desired size preference, if the D50 (up to 50% of the population) is about the intended size; whereas a population of particles wherein the D90 is about the intended size implies a vast majority of particles (up to 90% of the population) satisfy the same.

The particles may have, depending on shape, a variety of "characteristic dimensions", such as a long dimension or a maximum long dimension, which may be averaged to characterize a population consisting of a plurality of such particles, this representative value being termed Lavg. Particles can additionally be characterized by a short dimension or a maximum short dimension, the short dimension typically being the thickness of the particles for platelet shaped ones. This second characteristic dimension can also be averaged to identify the relevant population of particles, this representative value being termed Havg.

Particles suitable for the present printing system and method may have an average maximum long dimension Lavg of at most 800 micrometers, at most 600 µm, at most 400 µm, at most 250 µm, at most 150 µm, at most 100 µm, at most 80 µm, at most 60 µm, at most 40 µm, at most 25 µm, at most 20 µm, at most 15 µm, at most 12 µm, at most 10 µm, at most 8 µm, at most 6 µm at most 4 µm, at most 3 µm, at most 2 µm, at most 1.5 µm, at most 1.2 µm, at most 1.0 µm, at most 0.8 µm, at most 0.7 µm, at most 0.65 µm, or at most 0.6 µm. Additionally, the average maximum long dimension can be at least 0.04 micrometers, at least 0.05 µm, at least 0.06 µm, at least 0.08 µm, at least 0.10 µm, at least 0.12 µm, at least 0.15 µm, or at least 0.20 µm.

Particles suitable for the present printing system and method may further have an average maximum thickness Havg which can be of at most 1200 nm, at most 1000 nm, at most 800 nm, at most 600 nm, at most 500 nm, at most 400 nm, at most 350 nm, at most 300 nm, at most 250 nm, at most 200 nm, at most 175 nm, at most 150 nm, at most 125 nm, or at most 100 nm. Additionally, the average maximum thickness can be at least 5 nm, at least 7 nm, at least 10 nm, at least 15 nm, at least 20 nm, at least 25 nm, at least 30 nm, at least 40 nm, or at least 50 nm.

Though not essential, the particles may preferably be uniformly shaped and/or within a symmetrical distribution relative to a median value of the population and/or within a relatively narrow size distribution.

A particle size distribution is said to be relatively narrow if at least one of the two following conditions applies:
  A) the difference between the hydrodynamic diameter of 90% of the particles and the hydrodynamic diameter of 10% of the particles is equal to or less than 150 nm, or equal to or less than 100 nm, or even equal to or less than 50 nm, which can be mathematically expressed by: (D90–D10)≤150 nm and so on; and/or
  B) the ratio between a) the difference between the hydrodynamic diameter of 90% of the particles and the hydrodynamic diameter of 10% of the particles; and b) the hydrodynamic diameter of 50% of the particles, is no more than 2.0, or no more than 1.5, or even no more than 1.0, which can be mathematically expressed by: (D90–D10)/D50≤2.0 and so on.

The particles may have any suitable aspect ratio, i.e., a dimensionless ratio between the smallest dimension of the particle and the equivalent diameter in the largest plane orthogonal to the smallest dimension. The equivalent diameter can be for instance the arithmetical average between the longest and shortest dimensions of that largest orthogonal plane. Such dimensions are generally provided by the suppliers of such particles and can be assessed on a number of representative particles by methods known in the art, such as microscopy, including in particular by scanning electron microscope SEM (preferably for the planar dimensions) and by focused ion beam FIB (preferably for the thickness and length dimensions). Particles having an almost spherical shape are characterized by an aspect ratio of approximately 1:1, whereas flake-like particles can have an aspect ratio (i.e. between the average of the longest lengths of planar projections of the particles (maximum long dimension) or of their mean or equivalent diameters, as the case may be, and the average thickness (maximum short dimension) of the particles) of 100:1 or more. Though not limiting, the particles according to the present teachings can have an aspect ratio (or average aspect ratio being defined by: ASPavg=Lavg/Havg) of about 100:1 or less, of about 75:1 or less, of about 50:1 or less, of about 25:1 or less, of about 10:1 or less, or even of about 2:1 or less. In some embodiments, the particles according to the present teachings may have an aspect ratio (or average aspect ratio) of at least 2:1, at least 3:1, at least 5:1, at least 10:1, at least 25:1, at least 40:1, or at least 70:1. In some embodiments, the particles according to the present teachings may have an aspect ratio (or average aspect ratio) within a range of 2:1 to 500:1, 4:1 to 500:1, 8:1 to 500:1, 20:1 to 500:1, 20:1 to 300:1, 20:1 to 250:1, 20:1 to 200:1, or 20:1 to 100:1.

In these embodiments, the (overall or average) maximum long dimension, maximum short dimension and aspect ratio for a group of particles may be volume-averaged, surface-area averaged, or number averaged.

In some embodiments, the aspect ratios of representative particles may be estimated by SEM techniques and/or by SEM-FIB techniques, as described in further detail herein.

While selecting a representative particle, or a group of representative particles that may accurately characterize the aspect ratio of the population, it will be appreciated that a more statistical approach may yet more accurately characterize the aspect ratio of particles within the population. Thus, in some embodiments of the present disclosure, the aspect ratio of the particles may be determined by analyzing, in its entirety, a representative field of view of the image-capturing instrument (e.g., SEM). Typically, the magnification is adjusted such that at least 5 particles, at least 10 particles, at least 20 particles, or at least 50 particles are disposed within a single field of view. As above, the (overall or average) aspect ratio for a group of particles may be volume-averaged, surface-area averaged, or number averaged.

As used herein in the specification and in the claims section that follows, the term "aspect ratio", or "particular aspect ratio" refers to the dimensionless ratio between the smallest dimension of the particle and the equivalent diameter in the largest plane orthogonal to the smallest dimension.

As used herein in the specification and in the claims section that follows, the term "equivalent diameter" refers to the arithmetical average between the longest and shortest dimensions of that largest orthogonal plane.

As used herein in the specification and in the claims section that follows, the term "average aspect ratio" or "overall aspect ratio" refers to the aspect ratio of a plurality of particles, each having a particular aspect ratio.

In addition to their impact on the visual effect to be imparted, the particles may have shapes and/or dimensions suitable to provide for sufficient contact area with the donor surface, and subsequently with the desired substrate regions (e.g., on a receptive layer), at least over a time period the visual effect is desired or until an overcoat is applied.

Depending on their composition and/or on the processes they undergo (e.g., milling, recycling, burnishing, etc.), the particles can be hydrophobic with different degrees, if any, of hydrophilicity. As the balance between the hydrophobic and hydrophilic nature of the particles may shift with time, the process is expected to remain efficient if the hydrophobic nature of the particles predominates. Additionally, the particles may be made of materials intrinsically hydrophilic, in which case they can be rendered hydrophobic by application of a particle coating. Materials suitable for such a particle coating can have a hydrophilic end with affinity to the particle (e.g., a carboxylic function affine to a metal oxide) and a hydrophobic tail. In the present disclosure such particles, whether intrinsically hydrophobic or coated to become hydrophobic or more hydrophobic, are said to be substantially hydrophobic.

The hydrophobicity of the particles may be a known property inherent to their chemical composition. If needed, the degree of hydrophobicity or hydrophilicity can be assessed by measurement of the contact angle of a droplet of reference liquid (typically deionized water) on a sizeable surface of the bulk material forming the particles or of their coat, as applicable. Those of skill in the art will readily appreciate that a contact angle may be used to characterize a degree of hydrophilicity or hydrophobicity, according to standard techniques. A contact angle above 90° may indicate a hydrophobic surface, while a contact angle below this value may be indicative of a hydrophilic surface. Additionally, hydrophobicity may be assessed at the scale of the particles by introducing a predetermined amount of the particles to deionized water. Hydrophobic particles will display a leafing behavior, migrating towards the air interface, while hydrophilic particles will exhibit a non-leafing pattern, allowing them to maintain a fairly random distribution in the water carrier. Such phase separation, or lack thereof, can be facilitated by the addition of a non-water miscible oil phase, in which case the hydrophobic particles migrate towards the oil phase, while hydrophilic particles tend to remain in the aqueous phase. Determination of the concentration of particles in the initial water sample and in the final separated phases, the phase separation being typically performed three times for a given sample, allows assessing the hydrophobic or hydrophilic behavior of the particles. Additional methods can be used, such as surface adsorption assays using a known proportion of Rose Bengal dye per the amount of particles to be tested. The dye adsorbs on hydrophobic surface of particles as a function of their surface area. The unbound dye remaining in the aqueous phase can be measured by spectrophotometry, providing an estimate of the bound amount commensurate with the hydrophobicity of the particles. The relative hydrophobicity can be determined by calculating the Partition Quotient of the dye between the amount absorbed and the unbound amount. Similarly, Nile Blue dye can be used to determine the hydrophilicity of the particles surface. Additional methods are known and can be suitable. As used herein, the term "hydrophobic" and the like is used for particles and materials that exhibit hydrophobicity according to at least one (and preferably at least two or three) of the above-described characterization methods.

In one embodiment, the particles are of aluminum and are coated with a carboxylic acid that renders the particles hydrophobic, reduces their ability to stick to one another and reduces their oxidation. The hydrophobicity of such particles when coated with stearic acid was estimated by measuring the contact angle formed by a droplet of deionized water, according to the method described in more details for the donor surface. Such coated particles displayed a wetting angle of 130.1+6°. However, as mentioned, particles having any wetting angle exceeding 90° can be suitable.

The particles can be carried by either a gaseous or a liquid fluid when they are sprayed onto the donor surface or upon the intermediate applicator(s). When the particles are suspended in a liquid, in order both to reduce cost and minimize environmental pollution, it is desirable for the liquid to be aqueous. In such a case, it is desirable for the material used to form or coat the particles to be hydrophobic. Hydrophobic particles more readily separate from an aqueous carrier, facilitating their tendency to attach to and coat the donor surface. Such preferential affinity of the particles towards the donor surface of the coating device, rather than towards their carrier and towards one another, is deemed particularly advantageous. Blowing a gas stream over the particle coating (which as mentioned can preferably be formed by hydrophobic particles on an hydrophobic surface) will both serve to dislodge and/or entrain particles not in direct contact with the donor surface and to at least partially dry the coating on the donor surface.

When applying to the substrate 20 an effect similar to foil imaging, the particles may be, as mentioned, metallic or more generally metal-looking and may be coated or uncoated. Because of the manner in which such particles are produced (commonly by milling), they tend to be flat platelets and though not essential this enables highly reflective coatings of near mirror quality to be achieved when the particles have light reflective surfaces and their planar dimension are substantially aligned with the surface of the substrate. Such particles lend themselves to burnishing, which may be carried our either by the use of high pressure during the spraying or by means of a burnishing roller, such as the optional roller 40 and counter roller 42 shown in FIG. 2.

In addition, or as an alternative, to burnishing the particle layer after it has been transferred to the substrate, it is possible to burnish it while it is still on the donor surface 12. Thus, a burnishing roller or other wiping element may be positioned immediately downstream or as part of the coating apparatus 14.

Burnishing may be carried out with a dry roller or with a wet roller (e.g., impregnated and/or washed with the fluid on which the particles are suspended, for instance water). In the event that an intermediate applicator is used, it cannot be ruled out that it may, in addition to applying the particles to the donor surface also at least partly burnish them. It is believed that during burnishing, the size of the particles is reduced as compared to their original size upon initial injection into the coating apparatus, and that, alternatively and additionally, the burnished particles are oriented in a substantially parallel manner with respect to the donor surface.

The outer surface of the optional burnishing roller may rotate at a linear speed different than that of the donor surface of the drum and/or of the outer surface of an intermediate applicator, if present. It can rotate in the same or counter-direction relative to the drum.

The Particle Carrier

The particle carrier, that is to say the fluid within which the particles are suspended, may be either a liquid or a gas. If liquid, the carrier is preferably water based and if gaseous the carrier is preferably air. The particles may be lyophobic (i.e., having no affinity) with respect to their carrier, for instance may be hydrophobic, while the carrier is an aqueous liquid. Such may result in particles being partly dispersed in the liquid, and partly phase separated (all types of such mixtures of materials of same or different phases being herein encompassed by the term "suspended"). In addition to the particles, the carrier may comprise any additive known in the art of particle formulation, such as dispersants, surfactants, water-miscible solvents, co-solvents, stabilizers, preservatives, viscosity modifiers, pH modifiers, and the like. All such additives and their typical concentrations are known to persons skilled in the art of dispersions and need not be further detailed herein. Additives (or mixtures thereof) not affecting the hydrophobicity of the particles and of the donor surface are preferred. Such agents, in particular the dispersing agents, may assist in maintaining or increasing the stability of the suspended particles in the liquid (including in phase separated form, if desired). The liquid carrier may also comprise excess of unbound material serving as particle coat, if desired when applicable. Any such additive and mix thereof, preferably do not affect the overall inertness of the liquid carrier towards the donor surface (e.g., avoiding or reducing any deleterious swelling of the surface that would prevent proper coating by attachment of the particles).

A liquid carrier is said to be aqueous if it contains at least 80 wt. % water (i.e., 80% by weight of the total composition), or at least 85 wt. %, or at least 90 wt. %, or at least even 95 wt. % water. It is to be understood that though final work aqueous compositions may predominantly contain water, as previously mentioned, it is possible to prepare intermediate aqueous compositions containing a higher amount of solid particles (and additives if any) and lower amount of water. Such intermediate compositions may serve as concentrates, which can be diluted to desired working concentrations when needed, but stored and/or shipped in smaller volumes. A concentrate may for instance comprise as much as about 80 wt. % of solids and about 20 wt. % of a water miscible co-solvent, the water being added during dilution of the concentrate.

The Donor Surface

The donor surface 12 in some embodiments is a hydrophobic surface, made typically of an elastomer that can be tailored to have properties as herein disclosed, generally prepared from a silicone-based material. Poly(dimethylsiloxane) polymers, which are silicone-based, have been found suitable. In one embodiment, a fluid curable composition was formulated by combining three silicone-based polymers: a vinyl-terminated polydimethylsiloxane 5000 cSt (DMS V35, Gelest, CAS No. 68083-19-2) in an amount of about 44.8% by weight of the total composition (wt. %), a vinyl functional polydimethyl siloxane containing both terminal and pendant vinyl groups (Polymer XP RV 5000, Evonik Hanse, CAS No. 68083-18-1) in an amount of about 19.2 wt. %, and a branched structure vinyl functional polydimethyl siloxane (VQM Resin-146, Gelest, CAS No. 68584-83-8) in an amount of about 25.6 wt. %. To the mixture of the vinyl functional polydimethyl siloxanes were added: a platinum catalyst, such as a platinum divinyltetramethyldisiloxane complex (SIP 6831.2, Gelest, CAS No. 68478-92-2) in an amount of about 0.1 wt. %, an inhibitor to better control curing conditions, Inhibitor 600 of Evonik Hanse, in an amount of about 2.6 wt. %, and finally a reactive cross-linker, such as a methyl-hydrosiloxane-dimethylsiloxane copolymer (HMS 301, Gelest, CAS No. 68037-59-2) in an amount of about 7.7 wt. %, which initiates the addition curing. This addition curable composition was shortly thereafter applied with a smooth leveling knife upon the support of the donor surface (e.g., an epoxy sleeve mountable on drum 10), such support being optionally treated (e.g., by corona or with a priming substance) to further the adherence of the donor surface material to its support. The applied fluid was cured for two hours at 100-120° C. in a ventilated oven so as to form a donor surface.

The hydrophobicity is to enable the particles exposed to selective stripping by the tacky film created on the receptive layer bearing substrate to transfer cleanly to the substrate without splitting.

The donor surface should be hydrophobic, that is to say the wetting angle with the aqueous carrier of the particles should exceed 90°. The wetting angle is the angle formed by the meniscus at the liquid/air/solid interface and if it exceeds 90°, the water tends to bead and does not wet, and therefore adhere, to the surface. The wetting angle or equilibrium contact angle $\Theta_0$, which is comprised between and can be calculated from the receding (minimal) contact angle $\Theta_R$ and the advancing (maximal) contact angle $\Theta_A$, can be assessed at a given temperature and pressure of relevance to the operational conditions of the process. It is conventionally measured with a goniometer or a drop shape analyzer through a drop of liquid having a volume of 5 µl, where the liquid-vapor interface meets the solid polymeric surface, at ambient temperature (circa 23° C.) and pressure (circa 100 kPa). Contact angle measurements can for instance be performed with a Contact Angle analyzer—Krüss™ "Easy Drop" FM40Mk2 using distilled water as reference liquid.

Such measurements were performed on a sample of donor surface prepared as above described, the sample having a size of 2 cm×2 cm. The results were analyzed using "Drop shape analysis" program, circle computer method, the advancing contact angle $\Theta_A$ of the above-described donor surface was found to be 101.7°±0.8° and the receding contact angle $\Theta_R$ was found to be 99.9°±3.1°. Typically, donor surfaces prepared by this method had contact angles in the range of about 95° to about 115°, generally not exceeding 110°.

This hydrophobicity may be an inherent property of the polymer forming the donor surface or may be enhanced by inclusion of hydrophobicity additives in the polymer composition. Additives that may promote the hydrophobicity of a polymeric composition may be, for example, oils (e.g., synthetic, natural, plant or mineral oils), waxes, plasticizers and silicone additives. Such hydrophobicity additives can be compatible with any polymeric material, as long as their respective chemical nature or amounts do not prevent proper formation of the donor surface, and for instance would not impair adequate curing of the polymeric material.

The roughness or finish of the donor surface will be replicated in the printed metallised surface. Therefore if a mirror finish or highly glossy appearance is required, the donor surface would need to be smoother than if a matte or satin look is desired. These visual effects can also be derived from the roughness of the printing substrate and/or of the receptive layer.

The donor surface 12 may have any Shore hardness suitable to provide a strong bond to the particles when they are applied using the coating apparatus 14, the bond being stronger than the tendency of the particles to adhere to one another. The hardness of the silicone-based surface may vary and for instance depend on the thickness of the donor surface and/or the particles intended to be bond. It is believed that for relatively thin donor surfaces (e.g., 100 µm or less), the silicone-based material may have a medium to low hardness; whereas for relatively thick donor surfaces (e.g., up to about 1 mm), the silicone-based material may have a relatively high hardness. Additionally, larger particles may typically benefit from a donor surface having a lower hardness than necessary to accommodate relatively smaller particles. In some embodiments, a relatively high hardness between about 60 Shore A and about 80 Shore A is suitable for the donor surface. In other embodiments, a medium-low hardness of less than 60, 50, 40, 30 or even 20 Shore A is satisfactory.

The donor surface 12 in the drawings is the outer surface of a drum 10 but this is not essential as it may alternatively be the surface of an endless transfer member having the form of a belt guided over guide rollers and maintained under an appropriate tension at least while it is passing through the coating apparatus. Additional architectures may allow the donor surface 12 and the coating station 14 to be in relative movement one with the other. For instance, the donor surface may form a movable plan which can repeatedly pass beneath a static coating station, or form a static plan, the coating station repeatedly moving from one edge of the plan to the other so as to entirely cover the donor surface with particles. Conceivably, both the donor surface and the coating station may be moving with respect to one another and with respect to a static point in space so as to reduce the time it may take to achieve entire coating of the donor surface with the particles dispensed by the coating station. All such forms of donor surfaces can be said to be movable (e.g., rotatably, cyclically, endlessly, repeatedly movable or the like) with respect to the coating station where any such passing donor surface can be coated with particles (or replenished with particles in exposed regions).

The donor surface may additionally address practical or particular considerations resulting from the specific architecture of the printing system. For instance, it can be flexible enough to be mounted on a drum, have sufficient abrasion resistance, be inert to the particles and/or fluids being employed, and/or be resistant to any operating condition of relevance (e.g., pressure, heat, tension, etc.). Fulfilling any such property tends to favorably increase the life-span of the donor surface.

The donor surface, whether formed as a sleeve over a drum or a belt over guide rollers, may further comprise, on the side opposite the particle receiving outer layer, a body, which together with the donor surface may be referred to as a transfer member. The body may comprise different layers each providing to the overall transfer member one or more desired property selected, for instance, from mechanical resistivity, thermal conductivity, compressibility (e.g., to improve "macroscopic" contact between the donor surface and the impression cylinder), conformability (e.g., to improve "microscopic" contact between the donor surface and the printing substrate on the impression cylinder) and any such characteristic readily understood by persons skilled in the art of printing transfer members.

The Treating Station

As mentioned, numerous ways of applying a receptive layer (e.g., an adhesive or activatable adhesive) pattern to a printing substrate are known, especially in conventional non-digital printing systems as discussed in relation with the possible alternative analog treating stations 36 schematically illustrated in FIG. 2. The imaging system 16 schematically illustrated in FIG. 1 provides one way of selecting the regions on the substrate where the particle coating applied to the donor surface 12 that will transfer to the substrate 20 at the impression station. Such an imaging system is required in the implementation of a digital treating station for a digital printing system.

An exemplary imaging system 16 may comprise a support 1601 carrying an array of laser sources such as VCSEL (Vertical Cavity Surface Emitting Laser) chips 1602 that are optionally arranged in pair(s) of rows in positions that are accurately predetermined relative to one another (e.g., in a staggered manner providing laser sources suitable to target points along the entire width of the substrate). The support 1601 may be fluid cooled to cope with the significant heat that may be generated by the chips. Laser beams emitted by the chips 1602 are focused by lenses 1603 constructed as two or more corresponding rows of GRIN (Gradient-Index) rod lenses (each chip 1602, and all laser elements thereupon, being associated with a corresponding focusing lens 1603). Signals supplied to the chips for the activation of one or more laser element are synchronized with the movement of the substrate 20 in the direction of the illustrated arrow (i.e. from the treating or imaging station towards the impression station) by a transport system (not shown in FIG. 1). The effect of the irradiation of each pixel by a laser beam is to convert an inactive receptive layer on the substrate 20 at that pixel into a tacky state (i.e. an active receptive layer) so that particles coating the donor surface 12 may later transfer and adhere thereto. In other words, such irradiation mediated activation of the receptive layer provides on the substrate selected areas 24 having more affinity towards the particles than the particles have with the donor surface, the activated areas thus being able to selectively detach particles from the donor surface 12.

If used for color printing, the systems shown in FIGS. 1 and 2 can only print in one color but multicolor printing can be achieved by passing the same substrate successively through multiple towers that are synchronized with one another and each printing a different color. Alternatively, and additionally, different colors can be obtained by applying a colored transparent overcoat (or a partial foreground image) above particles having a sufficiently light shade. For instance, a "gold" look can be achieved by overprinting a yellow-orange tint over "silver" looking aluminum particles.

The Substrate

The printing system shown in the drawing is not restricted to any particular type of substrate, as long as the particles have higher affinity towards the donor surface than to the bare substrate (i.e., in areas lacking a suitable receptive layer). The substrate may be individual sheets of paper or card or it may have the form of a continuous web. The substrate can also be made of a fabric or of leather. Because of the manner in which the particles are applied to the substrate, the particles tend to reside on the surface of the substrate. This allows printing of high quality to be achieved on paper of indifferent quality. Furthermore, the material of the substrate need not be fibrous and may instead be any type of surface, for example a plastics film or a rigid board. As previously explained, the substrate may also have any desired roughness adapted to the desired look, though such intended effect can also be modulated at the level of the receptive layer.

It should be recalled that some printing substrates may be supplied in coated or uncoated forms, or be otherwise pre-treated to facilitate their intended use. For instance, a substrate may be coated with a priming material that may enhance the later adhesion of a receptive layer to the substrate, or enable any other like step the substrate may be subjected to. In the present specification, the term "substrate" is to be understood in its broadest sense, irrespective of form, material and coating(s) or lack thereof, as a physical support to an image to be or having been printed, in particular able to bear the particles to be transferred thereupon.

The Impression Station

The illustrated impression station 18 comprises only a smooth impression cylinder 22 that is pressed against the drum 10 and its outer donor surface 12. The impression cylinder 22 may form part of a substrate transport system, in which case it may be equipped with grippers for engaging the leading edge of individual substrate sheets. Alternatively, the impression cylinder may bear a shape serving to further emboss the printing substrate to which the particles are being transferred.

As mentioned, a printing system according to present teachings may include more than one impression station. Separate impression stations, typically allowing the deposition of different compositions upon a substrate, such as the transfer of different particles or the printing of different colors or of different visual effects with a same color, may each include a different impression cylinder. However this needs not necessarily be the case. For instance, two or more treating stations (whether digital as illustrated by station 16 or analog as illustrated by station 36) can each have their respective downstream coating station/donor surface, and be radially positioned to face a single impression cylinder. This is schematically illustrated in FIG. 4 which exemplifies a case of three coating stations 14a, 14b and 14c, each preceded on its upstream side by a respective treating station 46a, 46b and 46c, the treating of substrate 20 or of a receptive layer thereupon being achieved by any suitable mean, as previously exemplified in a non-limitative manner with stations 16 and 36. The nips between donor surfaces 12a, 12b and 12c, and impression cylinder 22 form the radially disposed impression stations 18a, 18b and 18c. As previously explained, though FIG. 4 illustrates a plurality of impressions stations according to the present teachings, the printing system of the invention may alternatively and additionally include conventional impression station(s). Such stations may serve to print a background image to the selected regions to be coated with particles, or a foreground image being printed after the particles are transferred to the substrate, or both.

Furthermore, a printing system, even if mono-color, may include a perfecting system allowing double-sided printing. In some cases, perfecting can be addressed at the level of the substrate transport system, which may for example revert a substrate to a side not yet printed on and reefed the unprinted side of the substrate to the same treating and impressions stations having served to print the first side. In other cases, perfecting can be addressed by including two separate impression stations (and their respective upstream or downstream stations), each impression station enabling printing on a different side of the same substrate.

Exemplary Print-Outs

FIG. 5A to 5D show pictures of printing substrates as used and obtained according to the present teachings. The substrates were printed using a printing system as schematically illustrated in FIG. 2 with modifications as follows.

Briefly, the printing substrate was a web of either a synthetic paper (biaxially oriented polypropylene film (BOPP) White Matt P25 Synthetic54 Glassine Liner 60 gsm, Nirotech Adhesives & Coating Technologies, Israel) or a polypropylene plastic foil upon which a lacquer (Wessco®

3501 UV-varnish of Schmid Rhyner AG, Switzerland), was applied by flexographic printing at a linear velocity of 30 m/min to form, upon sufficient curing, a receptive layer 26. The thickness of the resulting layer was about 3.6-4.2 µm, as was determined by Laser Confocal Microscopy (Olympus, LEXT). The particles supplied to the coating station, to be dispensed upon the donor surface so as to substantially form a monolayer, were aluminum flakes (Aluminum powder 6150 supplied by Quanzhou Manfong Metal Powder Co., China, CAS No. 7429-90-5) having a roughly platelet shape with an average diameter of about 4 µm and an average thickness of about 70 nm. The particles were fed at a weight concentration of about 3 wt. % in water and sprayed upon a rolling cylindrical sponge serving as intermediate applicator 1420. The donor surface 12 was made of silicone-based polymers consisting of vinyl functionalized polydimethylsiloxane (PDMS), the addition curable formulation and preparation of which were detailed above. The printing substrate, including the patterns of the receptive layer applied in-line, was fed to the inventive printing system at ambient temperature, at a linear velocity of 30 m/min, and the force applied at the nip of the impression station was about 12 kg-f/cm.

Figure 5A:
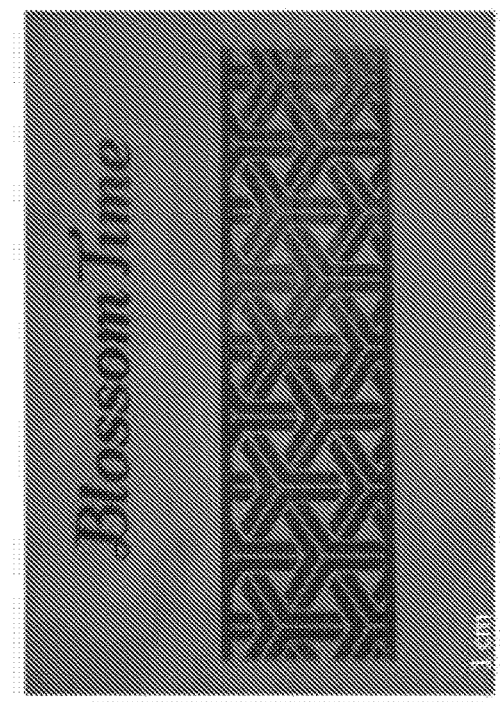
FIG. 5A is a picture on a black background paper substrate bearing an alternative pattern of a receptive layer applied by flexographic printing, the substrate being yet to be fed into an impression station according to the present disclosure.
Figure 5D:
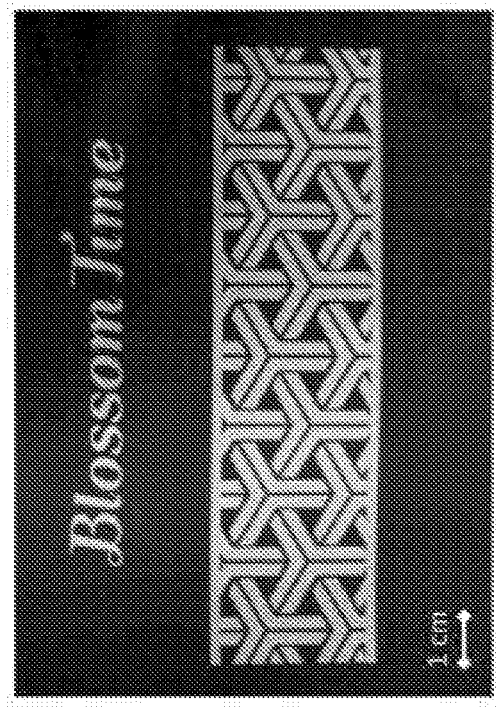
FIG. 5D is a picture of the same substrate as shown in FIG. 5A, on exiting the impression station.
Figure 5B:
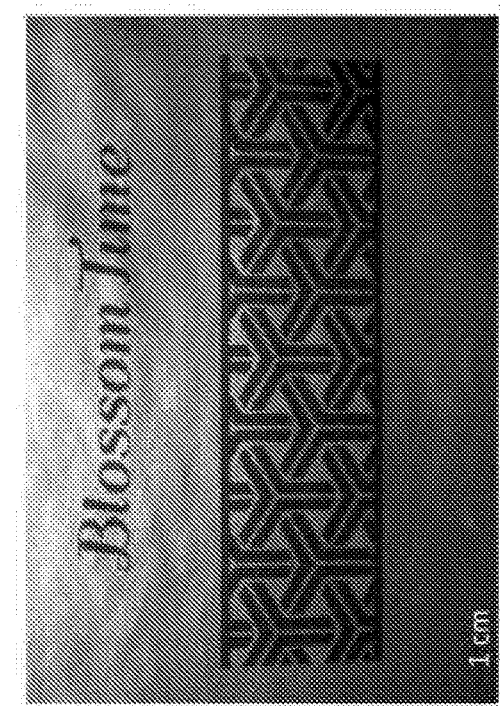
FIG. 5B is a picture of the same pattern as shown in FIG. 5A applied on a white paper substrate, on exiting the impression station.
Figure 5C:
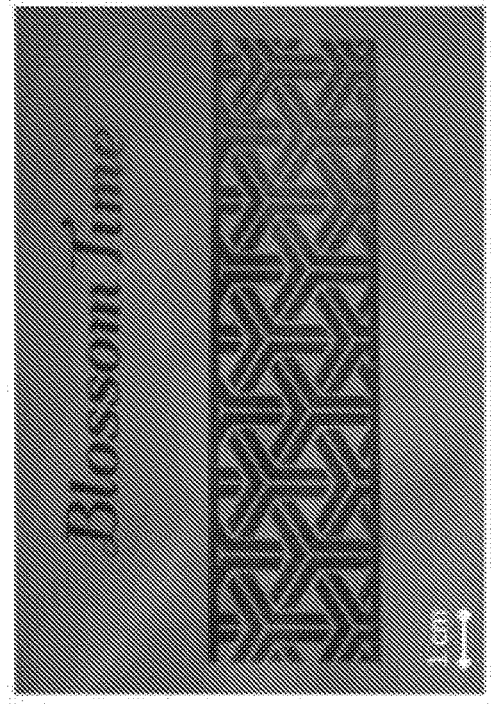
FIG. 5C is a picture of the same pattern as shown in FIG. 5A applied on a transparent plastic substrate, on exiting the impression station.

FIG. 5A shows a picture of the substrate before its feeding to the impression station, the darker patterns corresponding to the receptive layer as applied by flexographic printing as explained above. For enhanced visibility of the receptive layer, the BOPP white synthetic paper substrate was pre-printed with a black background image prior to the application of the receptive layer pattern. FIG. 5B shows a picture of a white BOPP paper substrate after its exit from the impression station, following its contacting with the aluminum particles coated on the donor surface, the darker patterns corresponding to the transferred particles. FIGS. 5C and 5D show similar post-impression pictures with contrasted metallised patterns, the substrate used in FIG. 5C being a transparent plastic foil (placed on a white background for the sake of the picture) and the substrate used in FIG. 5D being the black paper substrate of FIG. 5A.

FIGS. 6A to 6D are magnified views of a section of FIGS. 5A to 5D, respectively. As can be seen, the receptive layer patterned on the substrate suitably detached at the impression station the aluminum particles from the donor surface, so as to provide a corresponding metal printed image downstream of the impression station. Such images were not further processed in any way (e.g., no burnishing, no varnishing, etc.). It is further noted that the transfer left the corresponding regions on the donor surface 12 exposed (not shown), such regions being replenished with new particles upon completion of a subsequent cycle at the coating station.

Additional examples were printed using an alternative treating station in a printing system as schematically illustrated in FIG. 2 with modifications as follows. Briefly, the printing substrate was a photographic paper (HP, USA) upon which a lacquer (UV Screen Tactile Varnish, Cat. No. UVD0-1200-408N, Flint Group, Germany) was applied to form desired image patterns (e.g., including text and/or illustrations). The lacquer was applied by rotary silkscreen printing at a linear velocity of 20 m/min, the screen having an open surface of 36% and a mesh size of 165 µm. The layer formed on the substrate self-leveled while being transported to a curing station (e.g., for about 10 seconds or less). The lacquer coated and patterned substrate was carried out by a web substrate transport system comprising a unwinding roller supplying bare substrate, a winding roller collecting the substrate including the desired patterns of receptive layer, and intermediate rollers and support frames setting the path being traveled by the web substrate from its entry feeding side to its delivery side. The curing station, disposed downstream of the treating station (where the lacquer was applied) and upstream of the delivery winding roller, included UV lamps, so as to partially cure the UV curable lacquer. The receptive layer may preferably be cured to be sufficiently dry to the touch to permit the winding of the substrate in a manner that would not be deleterious to the receptive layer thereupon applied. Additionally, the receptive layer typically needs to remain sufficiently uncured so as to have enough affinity to the particles during printing (when contacting the particles at the impression station 18). Once sufficiently dried, in the present example by partial curing, the receptive layer formed the desired patterns for subsequent application of the particles. The receptive layer so formed had a thickness of about 52-65 µm above the surface of the substrate, as was determined by Laser Confocal Microscopy (Olympus, LEXT).

The above preparation of the substrate was performed off-line and the substrate was fed to the impression station of a printing system according to present teachings, using a standard substrate transport system, similar to that previously described. For enhanced visibility of the receptive layer, the paper substrate was pre-printed with a black background image prior to the application of the receptive layer pattern.

The printing substrate, including the patterns to become coated by particles during impression, the affinity of the selective patterns to the particles being higher than the affinity of the particles to the donor surface, was fed at a linear velocity of 0.2 m/sec, though the system may be operating at any other suitable velocity (e.g., often up to 2 m/sec, but even up to 15 m/sec or more). The force at the nip of the impression station 18, between the donor surface 12 and the impression cylinder 22 was of about 8 kg-f/cm and printing was performed at ambient temperature (circa 23° C.) without any further heating, neither at the nip nor upstream to the nip. Such operating conditions are not to be construed as limiting.

The particles (same as previously described) were supplied to the coating station at a weight concentration of about 0.1 wt. % in water to form a monolayer on a donor surface 12 made of PDMS, the addition curable formulation and preparation of which were detailed above.

Results (not shown) were similar to those depicted in FIGS. 5A, 5D, 6A and 6 D. Namely the pre-printed substrate 20 before its feeding to the impression station, displayed a pattern darker than background substrate, the pattern being formed from the material due to adhere to the particles upon impression (i.e., the dried lacquer forming the receptive layer 26). The same substrate after its exit from the impression station 18, following its contacting with the outer surface of rotating drum 10 and transfer of the aluminum particles that were previously coated on the donor surface 12, displayed a metallised version of the pattern. This further demonstrates that the receptive layer patterned on the substrate suitably detached at the impression station the aluminum particles from the donor surface, so as to provide a metal printed image having a corresponding pattern downstream of the impression station.

The speed at which a substrate 20 is transported along the various stations at which it is processed and/or the distance between subsequent such stations can be used to modulate the duration of each step, also referred to as the "residence time", even though the substrate is typically in motion. For instance, the residence time at the treating station can affect the level of activation of selected regions or the thickness of the applied receptive layer 26 (which depending on viscosity of the constituting substance and its method of deposition can be between a few and hundreds of micrometers). The receptive layer thickness that can be obtained by silkscreen printing application is typically between 50 and 500 µm, and more typically, at most 200 µm. It can be modified to provide an "embossing" look, if some distance between the top of the receptive layer (subsequently the layer of particles) and the substrate is desired. When using flexographic printing, a thinner receptive layer can be formed, having a thickness typically between 1 µm and 50 µm, and more typically, at most 15 µm.

It is believed that the residence time between the application of a substance due to form the receptive layer 26 and its setting for a subsequent step (e.g., drying, curing, contacting of particles, etc.) may affect the topography of the outer surface of the receptive layer. For instance, for glossy effects, given sufficient time the just-applied coating may level on the surface of the substrate to form a receptive layer having a substantially uniform thickness and/or having a relatively smooth outer surface. In such case, it may be preferable for the substance forming the receptive layer to have time to degas (i.e., reducing or eliminating the air bubbles that may be "entrapped" in the receptive layer) to further improve the topographical properties of the receptive layer outer surface so as to improve conformity to the particles and/or to improve the transfer of the particles to the printing substrate as a uniformly oriented mosaic of particles. The residence time at and following each station depends on the desired printing effect and on the materials being used in the process (e.g., type of substrate, receptive layer and particles). It will be appreciated that such process adjustments are known to persons skilled in the art of printing.

Magnified Views of Metallised Print-Outs

Magnified views of print-outs obtained by known technologies and by the present invention were captured by confocal microscopy, in a manner previously explained in relation with the assessment of the percentage of an area being covered by particles. The print-outs according to the present teachings were obtained by applying a receptive layer via silkscreen printing on a printing substrate made of paper. The donor surface and aluminum particles were as previously described, the particles being at a weight concentration of 3 wt. % of the aqueous composition. The printing substrate, including the patterns of receptive layer due to become coated by particles during impression, was fed at ambient temperature, at a linear velocity of 0.5 m/sec, and the force applied at the nip of the impression station was about 12 kg-f/cm.

Figure 7:
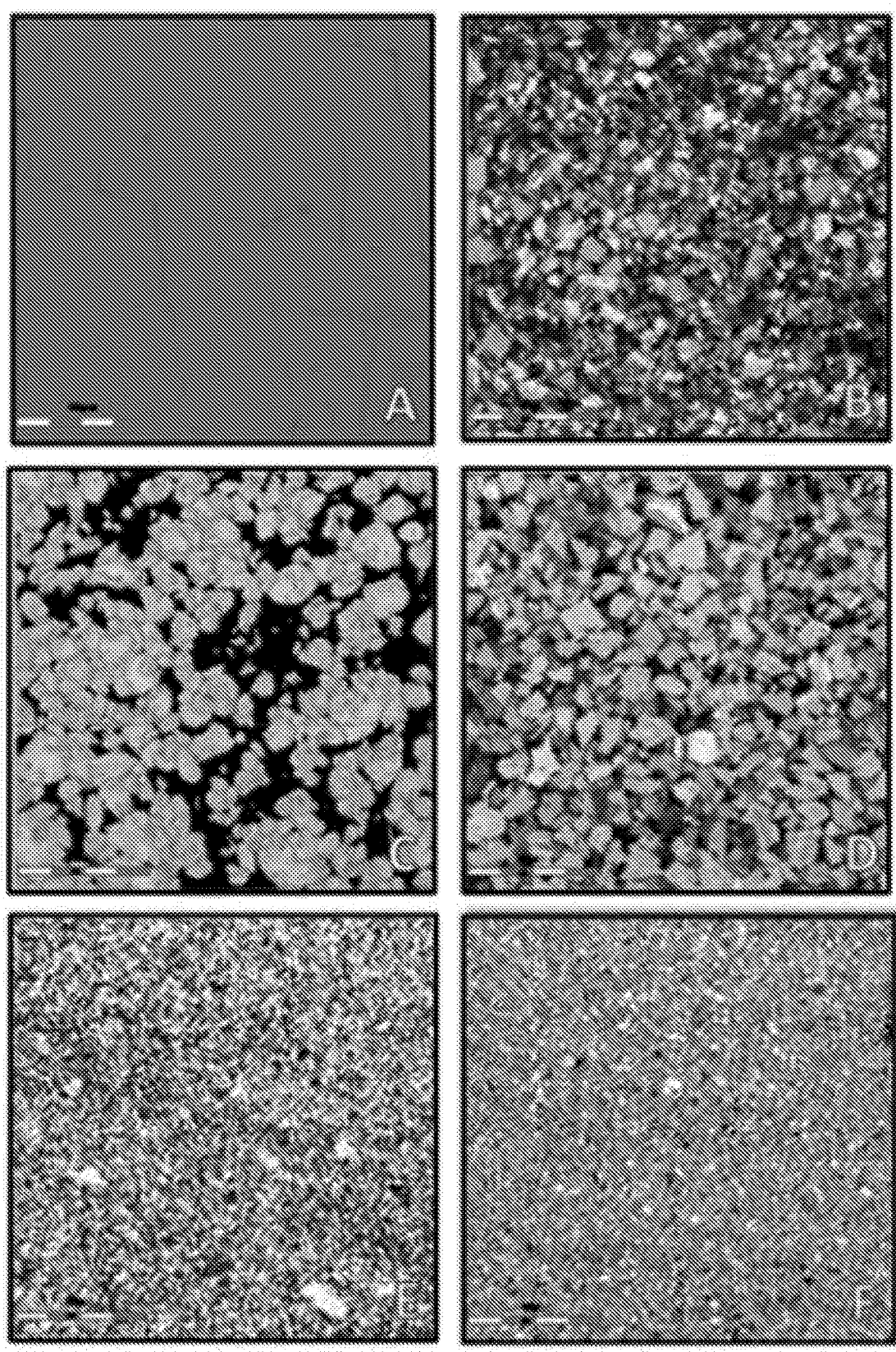
FIG. 7A is an image captured by confocal microscopy of a metallised substrate surface produced by hot foil stamping.
FIG. 7B is an image captured by confocal microscopy of a metallised substrate surface produced by offset printing.
FIG. 7C is an image captured by confocal microscopy of a metallised substrate surface produced by gravure printing.
FIG. 7D is an image captured by confocal microscopy of a metallised substrate surface produced by flexographic printing.
FIG. 7E is an image captured by confocal microscopy of a metallised substrate surface produced using a printing system and method of the present disclosure.
FIG. 7F is an image captured by confocal microscopy of a particle coated donor surface used in the printing system and method of the present disclosure.

Representative magnified micrographs, all images being with the same magnification, are shown in FIGS. 7A to 7F. Panels A to D of the figure display images showing top views of conventionally metallised print-outs as obtained by: (A) Foil stamping (hot and cold techniques resulting in a substantially similar appearance); (B) Offset printing; (C) Gravure printing; and (D) Flexography. FIG. 7E shows a similarly magnified view of a print-out according to an embodiment of the present disclosure, whereas, for comparison, panel (F) displays a monolayer of particles as formed on the donor surface of the coating station, before being transferred to a printing substrate so as to form an image as magnified in panel (E). The scale bar in the lower left angle of all images corresponds to 40 µm.

As can be seen in panel (A), foil printing, whether hot (as shown) or cold, expectedly resulted in a continuous film of metal fully covering all of the captured area. The particulate layers conventionally obtained and illustrated in panels (B) to (D), are typically uneven, at least in one of the following aspects: a) the layer comprise stacks of overlapping particles; b) the stacks are randomly distributed, possibly as a result of the limitations of each conventional printing technology; c) the thickness of the layer is irregular in particular in presence of randomly distributed stacks; and/or d) the voids between neighboring particles are randomly distributed, possibly as a result of the limitations of each conventional printing technology. It is observed that the general appearance of the conventional print-outs from which the images of panels (B) to (D) were taken can be broadly described has being hazier than the relatively more glossy print-out according to the present teachings. It is interesting to note that even the layer of particles formed on the donor surface can be relatively more glossy than conventional print outs. This further suggests that particles as conventionally applied to metallise a surface are of irregular orientations, the amount of particles possibly parallel with the surface of the substrate being insufficient to provide enough light reflection for a glossy effect. In other words, the "reflective potential" of substantially parallel particles is diminished or counterbalanced by the "scattering" effect of the particles having "non-parallel" random orientations. In contrast with such comparative technologies relying on printing of particles, the present method enables a more even orientation of the particles, the particles being predominantly parallel to the substrate, as supported by the relatively high gloss and confirmed by Atomic Force Microscopy (AFM) and FIB measurements performed on cross-sections of resulting print-outs.

It should be noted that, in contrast with metal inks used in conventional printing technologies, compositions of metal looking particles suitable for the present printing method need not to comprise a binder (e.g., a polymeric binder). Thus, the present monolayers are devoid or substantially devoid of a binder, whereas metal ink images created using such conventional necessarily binder-containing metal inks typically appear on the printed substrate as a continuous film of binder "bridging" between adjacent particles. As conventionally used binders typically envelop particles of the art in all three dimensions, the resulting print construction generally appears as a film of binder surrounding randomly formed arrangements of particles, generally entrapping the strata of particles and over-coating them. This is illustrated in FIGS. 9B and 9C, discussed herein-below.

The gloss of the metallised surface of printed samples can be measured by any suitable instrument. In the present examples, it was measured using a Haze-gloss Reflectometer (BYK, Cat. No. AG-4601), the illuminator projecting the incident light and the detector measuring the reflected light at angles of 20° perpendicular to the surface, the illuminator and detector thus having 40° arc distance from one another. All samples tested were printed on paper substrate, having a size of 4 cm×2 cm, the metallised samples corresponding to conventional technologies being obtained from commercial printers. For each technology, at least three randomly received samples were tested and their gloss values averaged. While it cannot be ruled out that each conventional print-metallisation technology can yield higher results, the following gloss values are deemed representative and provided in support of the even orientation of particles as applied and printed according to the present teachings.

Metallised surfaces printed as herein disclosed (using a silkscreen applicator) displayed an average gloss of 426 Gloss Units (GU). For comparison, five foil-printed samples displayed an average gloss of 489 GU; four offset-printed samples had an average gloss of about 22 GU; three gravure-printed samples had an average gloss of about 63 GU; and three flexography-printed samples had an average gloss of about 55 GU. Therefore, the present technology provides with a monolayer of particles a gloss comparable to foil printing, wherein the continuous film of metal is typically substantially parallel to the substrate surface. When compared to conventional technologies relying on individual particles, it can be seen that the present disclosure enables a significantly higher gloss corresponding to approximately 6.8-fold gravure-generated gloss, about 7.7 fold flexography-generated gloss and about 19-fold offset-generated gloss.

Normalizing such gloss values to the characteristic dimensions of the particles or films involved in each process can provide an additional measure of the outstanding outcome of the present printing method. A Gloss Per Size (GPS) parameter, provided in Gloss Units per micrometer, is herein defined as the gloss of a printed sample divided by a characteristic planar dimension of the gloss generating particle or film. The gloss can be measured as above-described and the characteristic dimension of the reflective surface of relevance to each printing technology or printed sample can be measured by confocal microscopy. Typically, such dimension is the average diameter or other characteristic dimension of at least twenty distinct particles deemed representative of the population of particles sampled on the printed substrate being tested. In existing printing technologies, it is typically believed that small flakes, of less than 10 μm or 5 μm, are to be avoided, particles having a distinct metallic character requiring an equivalent diameter of about 30 μm or more. Such small flakes, especially if smaller than 5 μm, are expected to cause a significant edge scattering effect, reducing the metallic brilliance and the gloss of a printed construction. It is also believed that smaller particles may have a lower tendency than larger particle to adopt a parallel configuration of the flakes, such alignment when parallel to the surface of the printing substrate also contributing to gloss.

Such analysis was applied to the above gloss results, taking into account measured average characteristic dimensions of about 2 μm for the particles of the inventive printed constructions, as compared to about 5 μm for the particles sampled in the offset printed construction, about 10 μm for the particles sampled in the flexographic and gravure printed constructions, and an infinite number arbitrarily set to 1000 μm for the continuous layer of the foil printed constructions. The GPS calculated for the printed constructions obtained by the method herein disclosed was of about 230 GU/μm. The GPS calculated for the known technologies as assessed on the available samples did not exceed 10 GU/μm. Still it cannot be ruled out that such technologies could yield printed constructions having a higher gloss and/or being formed from particles having a smaller characteristic dimension, resulting in a GPS of up to 20 GU/μm, or up to 30 GU/μm, or up to 40 GU/μm, or even up to 50 GU/μm. Even then, it is clear that the GPS of the printed constructions resulting from the method herein disclosed is significantly higher. It is believed that the printed constructions according to the present teachings can have, when using particles having a light reflective surface, a GPS of at least 100 GU/μm, or at least 150 GU/μm, or at least 200 GU/μm, or at least 300 GU/μm, or at least 400 GU/μm, or even at least 500 GU/μm. It is understood that such parameter is of relevance only if gloss is a desired quality of the printed constructions. When the particles used in the present printing system and/or method are not intended to confer gloss to the printed construction, the GPS of the resulting printed constructions can be below 100 GU/μm.

Alternative Substrate Treating

A similar printing experiment was performed in which the receptive layer was applied to a synthetic paper substrate (biaxially oriented polypropylene film (BOPP) White Matt P25 Synthetic54 Glassine Liner 60 gsm, Nirotech Adhesives & Coating Technologies, Israel) by flexographic printing. Wessco® 3501 UV-varnish of Schmid Rhyner AG, Switzerland, was applied to the substrate 20 to form, upon sufficient curing, the receptive layer 26. The thickness of the resulting layer was about 3.6-4.2 μm. The appearance of the metallised images (coated with particles of aluminum as above described) was as illustrated in FIGS. 5A to 6D and comparable (data not shown) to images obtained with silkscreen-applied receptive layers. Additionally, the layers of particles formed on such treated substrate were similar (data not shown) to those previously observed on magnified views of images obtained with silkscreen-applied receptive layers (see FIG. 7E, for reference).

The percent area coverage or optical surface coverage was assessed as previously described. Briefly, samples were similarly prepared by flexographic printing of the receptive layer on a transparent plastic foil of BOPP, images of metallised areas (i.e., formed on the layer) were captured by Optical Microscope (Olympus BX61 U-LH100-3) at a magnification of ×50 and analyzed in transmission mode. The results of three samples (each being an average of three images) were 81.3%, 84.9% and 86.4%.

Additional parameters were measured to compare a receptive layer as applied by silkscreen printing with a receptive layer as applied by flexographic printing, these two techniques being non-limiting examples of methods of treating a substrate for the present technology. The roughness of an area of the top surface of each layer (before their coating with particles) was measured using Laser Confocal Microscopy. The area roughness of the paper printing substrate upon which they were applied was measured as a reference. The substrate had an average baseline area roughness $R_a$ of 0.61 μm. When the receptive layer was applied on this substrate by silkscreen printing (layer thickness of about 52-65 μm), the area roughness $R_a$ of the top surface of the receptive layer was about 0.46 μm. When the receptive layer was applied on this substrate by flexographic printing (layer thickness of about 3.6-4.2 μm), the area roughness $R_a$ of the uppermost surface of the adhesive layer was 0.7 μm. Though not essential to the present technology, as depending on the desired printing effect, it is believed that receptive layers having a relatively low roughness (e.g., $R_a \leq 2$ μm or even $R_a \leq 1$ μm) favor a more uniform orientation of the particles, hence possibly a glossier appearance. It is also believed that a thicker receptive layer, in particular given sufficient time to properly level on the substrate and/or degas, may "absorb" and reduce part of the intrinsic roughness of the substrate, yielding an uppermost surface having a lower roughness than a relatively thin receptive layer which follows more strictly the contour of the substrate surface. It is expected that the contribution of the thickness of the receptive layer to the visible printing effect decreases for substrates being smooth per se (e.g., printing substrates made of plastic materials).

The various types of particle layers, which can be obtained by the printing method described hereinabove, are schematically illustrated in the cross-section along the x-y plane presented in FIGS. 8A and 8B. While particles 802, having an outer surface 804, are illustrated as having an elongated cross-sectional shape (e.g., corresponding to a platelet like particle), this should not be construed as limiting. Particles 802 are positioned on top of a receptive layer 26, itself selectively applied upon the image-receiving surface 80 of a printing substrate 20, such arrangement resulting in a printed construction 800 having a monolayer 810 of particles. As previously explained, the outer surfaces 804 of particles 802 can be hydrophobic.

Referring to FIG. 8A, several particles are shown to be partially overlapping, see section A, such overlap yielding an overall particle layer thickness denoted as T. In section B, the particles are illustrated as being contiguous, whereas section C points to a gap between neighboring particles that is discernible from a direction generally orthogonal to the broad face of printing substrate 20. In section D, a particle 806 is shown as having no contact with the receptive layer, as appearing in the present x-y-cross section. However, such an overlapping particle may be positioned over the particles contacting the underneath layer such that it could conceivably contact the receptive layer at another point (not shown) along the z-direction. In section E, a particle 808 is shown as being overlapped by more than one adjacent particle.

FIG. 8B illustrates an alternative embodiment, wherein the monolayer 810 of particles is further coated with an overcoat 820. Though not shown in the present illustration, it is believed that tiny air bubbles may be entrapped at or near the interface between the receptive layer 26 (and the monolayer 810 of particles disposed thereupon) and the subsequent overcoat 820. Such phenomenon may facilitate the visualization of the boundary between such layers as can be assessed by FIB-SEM techniques or any other robust method.

It should be noted that while monolayer 810 is illustrated in FIGS. 8A and 8B as being formed on top of a receptive layer, it can mildly penetrate to be partially embedded within the layer, depending on the operating conditions and selected materials. Moreover, though the illustrations related to schematic exemplary printed results of the present printing method, a layer substantially similar to 810 can be formed on the donor surface 12.

Figure 9A:
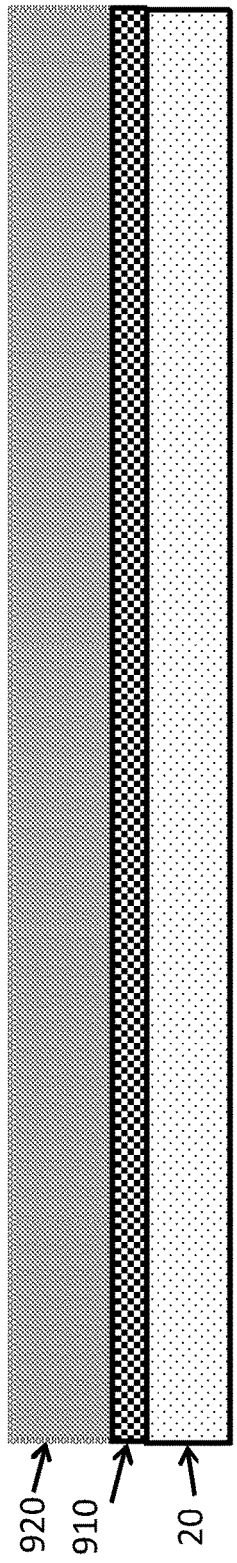
FIG. 9A is a schematic cross-section illustration of a conventional print construction as can be obtained by metal foil printing.
Figure 9B:
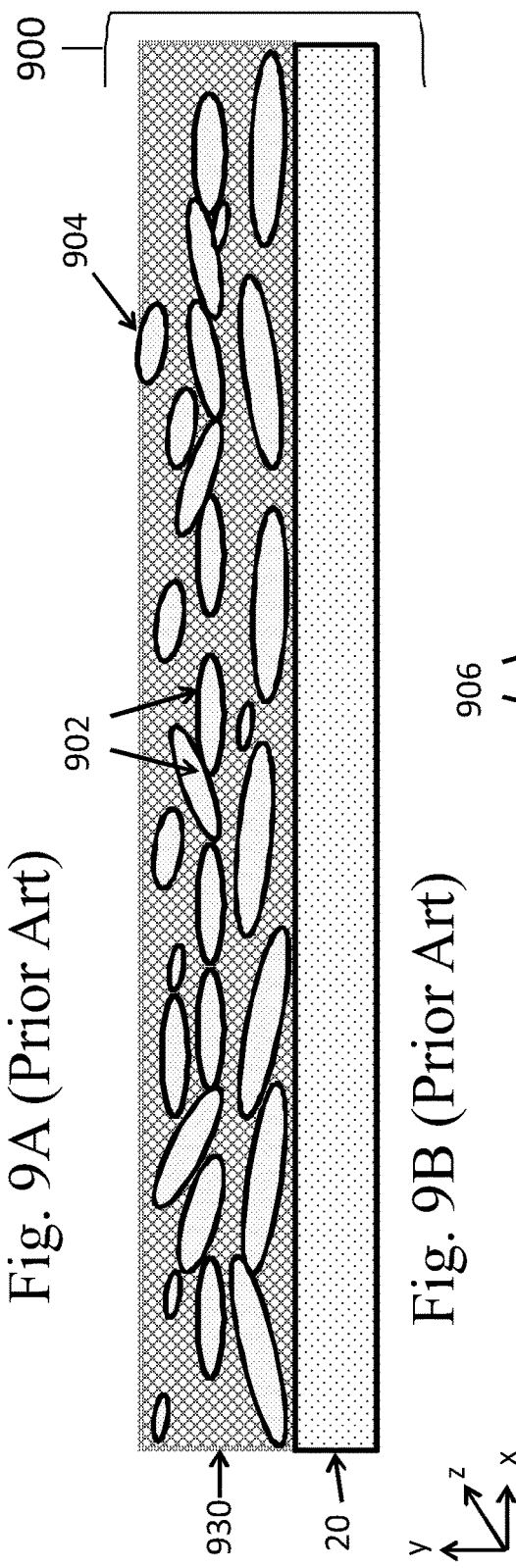
FIG. 9B is a schematic cross-section illustration of a print construction as can be obtained by conventional printing using a typical binder-containing metal ink wherein the particles display a non-leafing behavior.
Figure 9C:
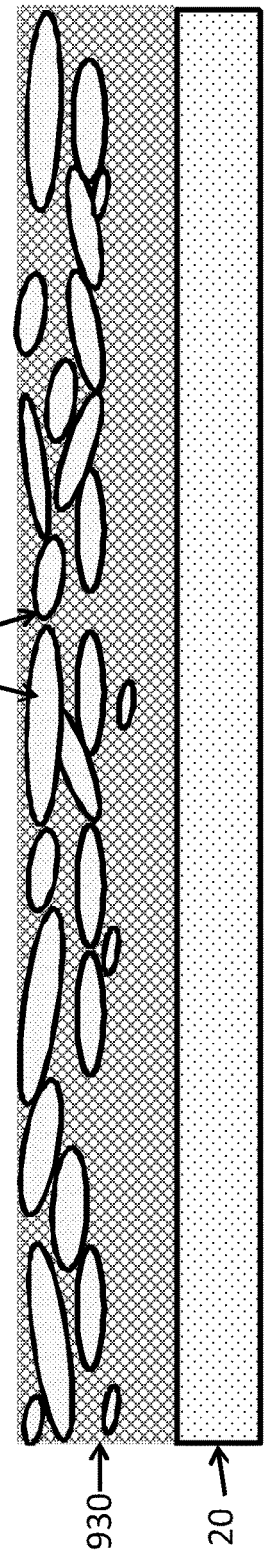
FIG. 9C is a schematic cross-section illustration of a print construction as can be obtained by conventional printing using a typical binder-containing metal ink wherein the particles display a leafing behavior.

FIGS. 9A to 9C schematically illustrate cross sections of printed constructions 900 as obtainable using known printing technologies. For avoidance of a doubt none of the illustrative figures are drawn to scale, such being the case in particular for FIGS. 8A-B and 9A-C, the comparison being therefore merely qualitative.

FIG. 9A illustrates a representative metallised image resulting from metal foil printing. In such printed construction an adhesive layer 910 is typically transferred with a metal layer 920, so as to permit the attachment of the metal layer to the substrate 20. FIGS. 9B and 9C illustrate printed constructions prepared with inks comprising a customary mixture of particles and a binder, such binder-containing inks being applied to a printing substrate 20 by printing methods of the art. Layer 930 illustrates the binder film or matrix typically formed on the substrate while using such known inks and methods. As can be seen, such techniques generally yield strata of particles, the particles in the strata more distant from the surface of the printing substrate having often no possible direct contact with the substrate. Depending on the printing technique, the materials used therein and the operation condition, the particles may display patterns falling broadly in two categories. FIG. 9B schematically illustrates a situation where particles 902, having an outer surface 904, display a non-leafing behavior, the particles being at least partially randomly distributed and/or oriented within the binder matrix. FIG. 9C schematically illustrates an alternative situation where particles 906 display a leafing behavior, the particles tending to migrate toward the interface between the binder film and air. Therefore such particles of known printed constructions tend to form a gradient of distribution, their density being higher closer to the interface with the air. Leafing particles are also typically more evenly oriented within the binder matrix. It is to be noted that in such examples, the surfaces 904 of particles 902 need not be hydrophobic. As previously illustrated in the context of the inventive print constructions enabled by the present disclosure, printed constructions of the prior art can be further overcoated (not shown).

In the description and claims of the present disclosure, each of the verbs, "comprise" "include" and "have", and conjugates thereof, are used to indicate that the object or objects of the verb are not necessarily a complete listing of members, components, elements, steps or parts of the subject or subjects of the verb. These terms encompass the terms "consisting of" and "consisting essentially of".

As used herein, the singular form "a", "an" and "the" include plural references and mean "at least one" or "one or more" unless the context clearly dictates otherwise.

Positional or motional terms such as "upper", "lower" "right", "left", "bottom", "below", "lowered", "low", "top", "above", "elevated", "vertical", "horizontal", "backward", "forward", "upstream" and "downstream", as well as grammatical variations thereof, may be used herein for exemplary purposes only, to illustrate the relative positioning, placement or displacement of certain components, to indicate a first and a second component in present illustrations or to do both. Such terms do not necessarily indicate that, for example, a "bottom" component is below a "top" component, as such directions, components or both may be flipped, rotated, moved in space, placed in a diagonal orientation or position, placed horizontally or vertically, or similarly modified.

Unless otherwise stated, the use of the expression "and/or" between the last two members of a list of options for selection indicates that a selection of one or more of the listed options is appropriate and may be made.

In the disclosure, unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended, or within variations expected from the measurement being performed and/or from the measuring instrument being used. When the term "about" precedes a numerical value, it is intended to indicate +/−15%, or +/−10%, or even only +/−5%, and in some instances the precise value.

While this disclosure has been described in terms of certain embodiments and generally associated methods, alterations and permutations of the embodiments and methods will be apparent to those skilled in the art. The present disclosure is to be understood as not limited by the specific examples described herein.

The invention claimed is:

1. A method of printing onto a surface of a substrate, which comprises providing an endless donor surface, cyclically passing the donor surface through a coating station from which the donor surface exits coated with a monolayer of individual particles after each passage, wherein the particles adhere more strongly to the donor surface than to one another, and repeatedly performing the steps of:

(i) treating the substrate surface to render the affinity of the particles to at least selected regions of the substrate surface greater than the affinity of the particles to the donor surface, (ii) contacting the substrate surface with the donor surface to cause particles to transfer from the donor surface only to the treated selected regions of the substrate surface, thereby exposing regions of the donor surface from which particles are transferred to corresponding regions on the substrate; and (iii) returning the donor surface to the coating station to render the particle monolayer continuous in order to permit printing of a subsequent image on a substrate surface.

2. A method as claimed in claim 1, wherein the proportion of the particles transferred to the selected regions of the substrate surface is such that a bare surface of the substrate within the selected regions is substantially imperceptible to the naked eye.

3. A method as claimed in claim 1, wherein the proportion of the substrate surface in the selected regions coated with particles is within the range of 80% to 100%.

4. A method as claimed in claim 1, wherein the proportion of the substrate surface in the selected regions coated with particles is within the range of 50% to 80%.

5. A method as claimed in claim 1, wherein the proportion of the substrate surface in the selected regions coated with particles is within the range of 20% to 50%.

6. A method as claimed in claim 1, wherein step (i) comprises exposing the selected regions of the substrate surface to radiation to activate a receptive layer that is pre-applied to the substrate.

7. A method as claimed in claim 1, wherein step (i) comprises applying a receptive layer to the selected regions of the substrate surface.

8. A method as claimed in claim 7, wherein the receptive layer is applied to the substrate surface by indirect printing.

9. A method as claimed in claim 8, wherein the receptive layer is applied to the substrate surface by indirect printing selected from the group comprising offset printing, screen printing, flexographic printing and gravure printing.

10. A method as claimed in claim 7, wherein the receptive layer is applied to the substrate surface by direct printing, including by direct jetting.

11. A method as claimed in claim 7, wherein the receptive layer applied or activated on the substrate surface has a thickness between about 0.5 µm and about 500 µm.

12. A method as claimed in claim 7, wherein the receptive layer applied or activated on the substrate surface has an outer surface distal from the substrate, said outer surface being substantially smooth with a surface roughness $R_a$ of no more than about 2 µm.

13. A method as claimed in claim 7, wherein the receptive layer applied or activated on the substrate surface is substantially dry upon contacting the particles coated on the donor surface.

14. A method as claimed in claim 1, wherein the particles coated on the donor surface are substantially dry upon contacting selected regions of the substrate surface.

15. A method as claimed in claim 1, wherein the particles comprise a coated or uncoated metal, alloy, mica or particles of a polymeric or ceramic material having a metallic appearance or surface reflectivity.

16. A method as claimed in claim 1, wherein the particles are flakes or platelet shaped.

17. A method as claimed in claim 16, wherein at least 50% of the particles, or at least 75% of the particles, or at least 90% of the particles have a thickness not exceeding 100 nm.

18. A method as claimed in claim 16, wherein at least 50% of the particles, or at least 75% of the particles, or at least 90% of the particles have a thickness of at least 10 nm.

19. A method as claimed in claim 16, wherein the particles have an average aspect ratio of at least 10:1, or at least 20:1, or at least 50:1, or at least 100:1 between at least one of a longest dimension, a mean diameter and an equivalent diameter, as the case may be, and a thickness of said platelet.

20. A method as claimed in claim 19, wherein said aspect ratio is at most 200:1, or at most 150:1, or at most 120:1.

21. A method as claimed in claim 16, wherein the particles transferred to the substrate surface are disposed upon the receptive layer in a substantially uniform orientation, the platelets being essentially parallel to a surface of the receptive layer distal to the substrate.

22. A method as claimed in claim 1, which comprises processing the substrate surface further after having made contact with the donor surface.

23. A method as claimed in claim 22, wherein the processing comprises burnishing or applying heat and pressure in order to modify the appearance of the particles adhered to the surface of the substrate.

24. A method as claimed in claim 22, wherein the processing comprises curing or further curing the receptive layer.

25. A method as claimed in claim 22, wherein the processing comprises coating at least the selected regions of the substrate surface or the entire surface of the substrate with a lacquer.

26. A method as claimed in claim 1, wherein contacting the substrate surface with the donor surface comprises transferring at least a portion of the monolayer of individual particles from the donor surface to the treated selected regions of the substrate surface.

* * * * *